(12) United States Patent
Wang et al.

(10) Patent No.: US 12,500,725 B2
(45) Date of Patent: *Dec. 16, 2025

(54) UPLINK ACK/NACK AND SR IN SHORT DURATIONS

(71) Applicant: QUALCOMM Incorporated, San Diego, CA (US)

(72) Inventors: Renqiu Wang, San Diego, CA (US); Yi Huang, San Diego, CA (US); Seyong Park, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,063

(22) Filed: Feb. 14, 2022

(65) Prior Publication Data

US 2022/0278808 A1    Sep. 1, 2022

Related U.S. Application Data

(63) Continuation of application No. 16/022,431, filed on Jun. 28, 2018, now Pat. No. 11,251,923.

(Continued)

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1607* (2013.01); *H04L 1/1671* (2013.01);
(Continued)

(58) Field of Classification Search
CPC ... H04L 1/1607; H04L 1/1671; H04L 1/1861; H04L 1/1887; H04L 5/001; H04L 5/0055;
(Continued)

(56) References Cited

U.S. PATENT DOCUMENTS 8,837,402 B2    9/2014    Nakao et al.
10,355,844 B2*   7/2019    Yang ................. H04L 5/001
(Continued)

FOREIGN PATENT DOCUMENTS

CN    103178926 A    6/2013
EP    3641432 A1    4/2020
(Continued)

OTHER PUBLICATIONS

Intel Corporation, "Short PUCCH formats for 1-2 UCI bits", 3GPP TSG RAN WG1 NR Ad-Hoc#2 R1-1710562, Qingdao, China, Jun. 27-30, 2017, Total p. 3 (Year: 2017).*

(Continued)

*Primary Examiner* — Shah M Rahman
(74) *Attorney, Agent, or Firm* — Paul M. McAdams; Procopio, Cory, Hargreaves & Savitch LLP

(57) ABSTRACT

Systems, methods, computer-readable medium, and apparatus are disclosed that allow for control information to be provided in an efficient manner during short burst transmission. For example, an apparatus may be configured to receive downlink control information (DCI) that indicates an allocated resource from a base station. The apparatus may also receive data from the base station. The apparatus may generate a cyclically shifted sequence that corresponds to a sequence that is cyclically shifted based on at least one of an ACK or NACK for the received data and a SR. The apparatus may then transmit the cyclically shifted sequence in the allocated resource within one symbol period of a slot of a subframe to the base station. Thus, by transmitting the (Continued)

SR and the ACK/NACK in one symbol, control information for short burst transmissions can be provided in a more temporally efficient manner without adding excessive complexity to the UE.

36 Claims, 13 Drawing Sheets

Related U.S. Application Data

(60) Provisional application No. 62/539,401, filed on Jul. 31, 2017, provisional application No. 62/539,479, filed on Jul. 31, 2017.

(51) Int. Cl.
*H04L 1/1829* (2023.01)
*H04W 72/20* (2023.01)
*H04L 1/1867* (2023.01)
*H04W 72/21* (2023.01)

(52) U.S. Cl.
CPC .......... *H04L 1/1861* (2013.01); *H04L 5/0094* (2013.01); *H04W 72/20* (2023.01); *H04L 1/1887* (2013.01); *H04L 5/001* (2013.01); *H04W 72/21* (2023.01)

(58) Field of Classification Search
CPC ............... H04L 5/0094; H04L 5/0053; H04W 72/0406; H04W 72/1284; H04W 72/20; H04W 72/21
See application file for complete search history.

(56) References Cited

U.S. PATENT DOCUMENTS

| | | | |
|---|---|---|---|
| 10,873,956 B2 | 12/2020 | Hwang et al. | |
| 11,197,277 B2* | 12/2021 | Matsumura | H04L 1/0026 |
| 11,240,788 B2* | 2/2022 | Matsumura | H04L 1/1812 |
| 11,533,744 B2 | 12/2022 | Luo et al. | |
| 2010/0046460 A1 | 2/2010 | Kwak et al. | |
| 2011/0170489 A1 | 7/2011 | Han et al. | |
| 2011/0305179 A1 | 12/2011 | Wang et al. | |
| 2012/0113962 A1 | 5/2012 | Jen | |
| 2012/0213187 A1* | 8/2012 | Yang | H04W 72/0453 370/329 |
| 2012/0320826 A1 | 12/2012 | Kim et al. | |
| 2013/0016707 A1 | 1/2013 | He et al. | |
| 2013/0044653 A1* | 2/2013 | Yang | H04W 72/0413 370/280 |
| 2013/0100911 A1 | 4/2013 | Lv et al. | |
| 2013/0301571 A1* | 11/2013 | Sorrentino | H04W 72/21 370/329 |
| 2014/0078974 A1* | 3/2014 | Falahati | H04W 52/146 370/329 |
| 2014/0219202 A1 | 8/2014 | Kim et al. | |
| 2014/0301324 A1 | 10/2014 | Cheng et al. | |
| 2014/0369294 A1* | 12/2014 | Seo | H04L 5/001 370/329 |
| 2015/0036607 A1* | 2/2015 | Park | H04L 27/2613 370/329 |
| 2016/0036578 A1 | 2/2016 | Malladi et al. | |
| 2016/0095069 A1 | 3/2016 | Noh et al. | |
| 2016/0345206 A1 | 11/2016 | Yerramalli et al. | |
| 2017/0013641 A1* | 1/2017 | Patel | H04W 72/02 |
| 2017/0041103 A1* | 2/2017 | Määttanen | H04L 1/1861 |
| 2017/0048829 A1 | 2/2017 | Kim et al. | |
| 2017/0245262 A1* | 8/2017 | Nayeb Nazar | H04L 1/001 |
| 2017/0264402 A1* | 9/2017 | Papasakellariou | H04W 52/40 |
| 2017/0366311 A1 | 12/2017 | Iyer et al. | |
| 2017/0373741 A1 | 12/2017 | Yang et al. | |
| 2017/0374658 A1 | 12/2017 | Kim et al. | |
| 2018/0092105 A1 | 3/2018 | Lee et al. | |
| 2018/0124815 A1 | 5/2018 | Papasakellariou | |
| 2018/0132264 A1 | 5/2018 | Jung et al. | |
| 2018/0139014 A1 | 5/2018 | Xiong et al. | |
| 2018/0192416 A1 | 7/2018 | Yin et al. | |
| 2018/0199367 A1 | 7/2018 | Jung et al. | |
| 2018/0249458 A1 | 8/2018 | He et al. | |
| 2018/0316464 A1* | 11/2018 | Stern-Berkowitz | H04W 72/23 |
| 2018/0324787 A1 | 11/2018 | Yin et al. | |
| 2019/0007175 A1* | 1/2019 | Kwak | H04L 5/0053 |
| 2019/0103951 A1 | 4/2019 | Park et al. | |
| 2019/0109732 A1 | 4/2019 | Choi et al. | |
| 2019/0140876 A1* | 5/2019 | Yoshimura | H04B 1/00 |
| 2019/0141700 A1 | 5/2019 | Kwak et al. | |
| 2019/0158334 A1 | 5/2019 | Kim et al. | |
| 2019/0222254 A1 | 7/2019 | Kim et al. | |
| 2019/0246416 A1 | 8/2019 | Park et al. | |
| 2019/0312669 A1 | 10/2019 | Kwak et al. | |
| 2019/0342877 A1* | 11/2019 | Matsumura | H04L 5/0051 |
| 2019/0356446 A1* | 11/2019 | Kim | H04W 72/0453 |
| 2020/0015225 A1* | 1/2020 | Matsumura | H04L 5/10 |
| 2020/0045691 A1 | 2/2020 | Park et al. | |
| 2020/0067680 A1 | 2/2020 | Nayeb Nazar et al. | |
| 2020/0068594 A1* | 2/2020 | Li | H04W 72/04 |
| 2020/0100241 A1 | 3/2020 | Takeda et al. | |
| 2020/0136777 A1 | 4/2020 | He et al. | |
| 2020/0137789 A1 | 4/2020 | Matsumura et al. | |
| 2020/0162298 A1* | 5/2020 | Kuchi | H04L 27/3411 |
| 2020/0170005 A1* | 5/2020 | Matsumura | H04L 1/1812 |
| 2020/0195387 A1* | 6/2020 | Matsumura | H04L 5/0055 |
| 2020/0205182 A1* | 6/2020 | Yamamoto | H04L 27/2614 |
| 2020/0236700 A1* | 7/2020 | Matsumura | H04L 5/0053 |
| 2020/0322199 A1* | 10/2020 | Matsumura | H04L 5/0051 |
| 2020/0322974 A1* | 10/2020 | Noh | H04L 5/0092 |
| 2021/0399769 A1* | 12/2021 | Park | H04L 5/005 |

FOREIGN PATENT DOCUMENTS

| | | | | |
|---|---|---|---|---|
| JP | 2010521942 A | 6/2010 | | |
| TW | 201642615 A | 12/2016 | | |
| WO | 2017119720 A2 | 7/2017 | | |
| WO | WO-2017146756 A1 * | 8/2017 | ........... | H04L 1/0026 |
| WO | WO-2018220773 A1 * | 12/2018 | ........... | H04L 1/1671 |

OTHER PUBLICATIONS

CATT: "PUCCH Resource Allocation", 3GPP Draft, R1-1707505, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017—2017051914, May 2017 (May 14, 2017), XP051272713, 5 Pages, Retrieved from the Internet: URL:http://www.3gpp.org/ftp/Meetings_3GPP SYNC/RAN1/Docs/ [retrieved on May 14, 2017].

Huawei., et al., "On HARQ-ACK Bundling in NR", R1-1706981, 3GPP TSG RAN WG1 Meeting #89, Hangzhou, China, May 15-19, 2017, 2 Pages.

International Search Report and Written Opinion—PCT/US2018/040416—ISA/EPO—dated Sep. 27, 2018.

Jung et al., "Methods to Multiplex Physical Channels and Signals for Flexible Radio Communication", Nov. 4, 2016, U.S. Appl. No. 62/418,010, 2016, pp. 1-10.

NTT DOCOMO Inc: "Sequence-Based PUCCH for UCI of up to 2 Bits", 3GPP TSG RAN WG1 NR Ad-Hoc#2, 3GPP Draft, R1-1711098, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051300298, 14 Pages, Retrieved from the Internet: URL: http://www.3gpp.org/ftp/Meetings_3GPP_SYNC/RAN1/Docs/ [retrieved on Jun. 26, 2017], Figure 7, Sect 1.1 and 3.2.

PANASONIC: "Discussion on 1-symbol NR-PUCCH for UCI of up to 2 bits", 3GPP Draft, R1-1711649, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 27, 2017 (Jun. 27, 2017), XP051305908, 14 Pages, Retrieved from the

(56) References Cited

OTHER PUBLICATIONS

Internet: URL:http://www.3gpp.org/ftp/tsg_ran/WG1_RL1/TSGR1_AH/NR_AH_1706/Docs/ [retrieved on Jun. 27, 2017].
Park et al., "Scheduling Request in New Rat", May 3, 2017, U.S. Appl. No. 62/501,060, 2017, pp. 1-16.
Taiwan Search Report—TW107122503—TIPO—dated Jan. 17, 2022.
Yin et al., "Short PUCCH Formats and SCH Eduling Request (SR)", May 4, 2017, U.S. Appl. No. 62/501,305,2017, pp. 1-42.
Nokia, et al., "On the Short PUCCH Design for Small UCI Payloads [online]", 3GPP TSG RAN WG1 adhoc NR_AH_1706, R1-1710893, Internet: URL: http://www.3gpp.org/ftp/tsg_ran/WG1_RL1/TSGR1_AH/NR_AH_1706/Docs/R1-1710893.zip, Jun. 16, 2017, 5 Pages.
NTT DOCOMO, Inc., "Sequence-Based PUCCH for UCI of up to 2 bits [online]", 3GPP TSG RAN WG1 #89, R1-1708470, Internet: URL: http://www.3gpp.org/ftp/tsg_ran/WG1_RL1/TSGR1_89/Docs/R1-1708470.zip. May 6, 2017, 9 Pages.
CATT: "Short PUCCH for Small UCI Payloads", 3GPP TSG RAN WG1 NR Ad-Hoc#2, R1-1710083, Qingdao, P.R. China, Jun. 27-30, 2017, 6 Pages.
Ericsson: "On the Design of 1-Symbol PUCCH for 1-2 bits UCI", 3GPP TSG-RAN WG1 #89, R1-1709080, Hangzhou, China, May 15-19, 2017, pp. 1-7.
NTT Docomo, Inc: "DMRS-Based vs. Sequence-Based PUCCH in Short Duration", 3GPP TSG RAN WG1 Meeting #88, R1-1702811, 3rd Generation Partnership Project, Mobile Competence Centre, 650, Route Des Lucioles, F-06921, Sophia-Antipolis Cedex, France, vol. RAN WG1, No. Athens, Greece, Feb. 13, 2017-Feb. 17, 2017, Feb. 12, 2017, XP051209956, 9 Pages.
Panasonic: "Discussion on 1-Symbol NR-PUCCH for UCI of Up to 2 bits", 3GPP TSG RAN WG1 NR Ad-Hoc#2, R1-1710930, Qingdao, P.R. China, Jun. 27-30, 2017, pp. 1-5.
Huawei, et al., "PUCCH Resource Allocation for HARQ-ACK and SR", 3GPP TSG RAN WG1 NR Ad-Hoc Meeting, R1-1710461, Qingdao, China, Jun. 27, 2017-Jun. 30, 2017, Jun. 17, 2017, 5 Pages.
NTT Docomo Inc: "Sequence-Based PUCCH for UCI of up to 2 Bits", 3GPP TSG RAN WG1 NR Ad-Hoc#2, R1-1711098, Qingdao, P.R. China Jun. 27-30, 2017, pp. 1-14.

* cited by examiner

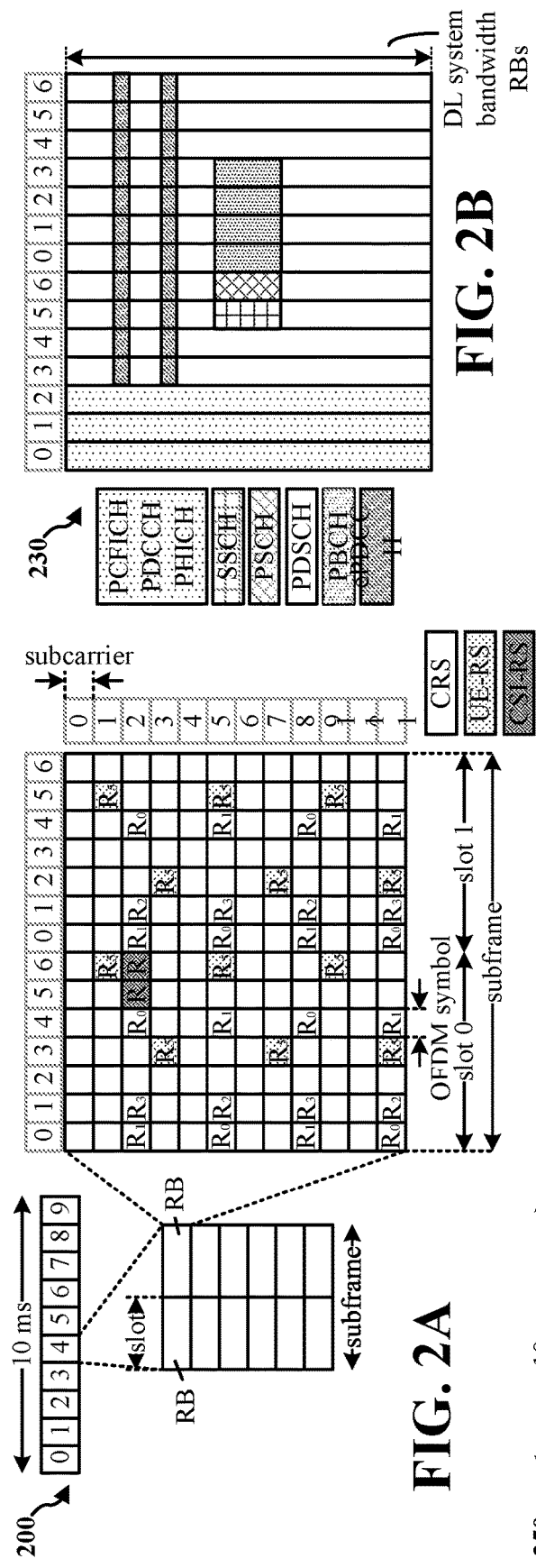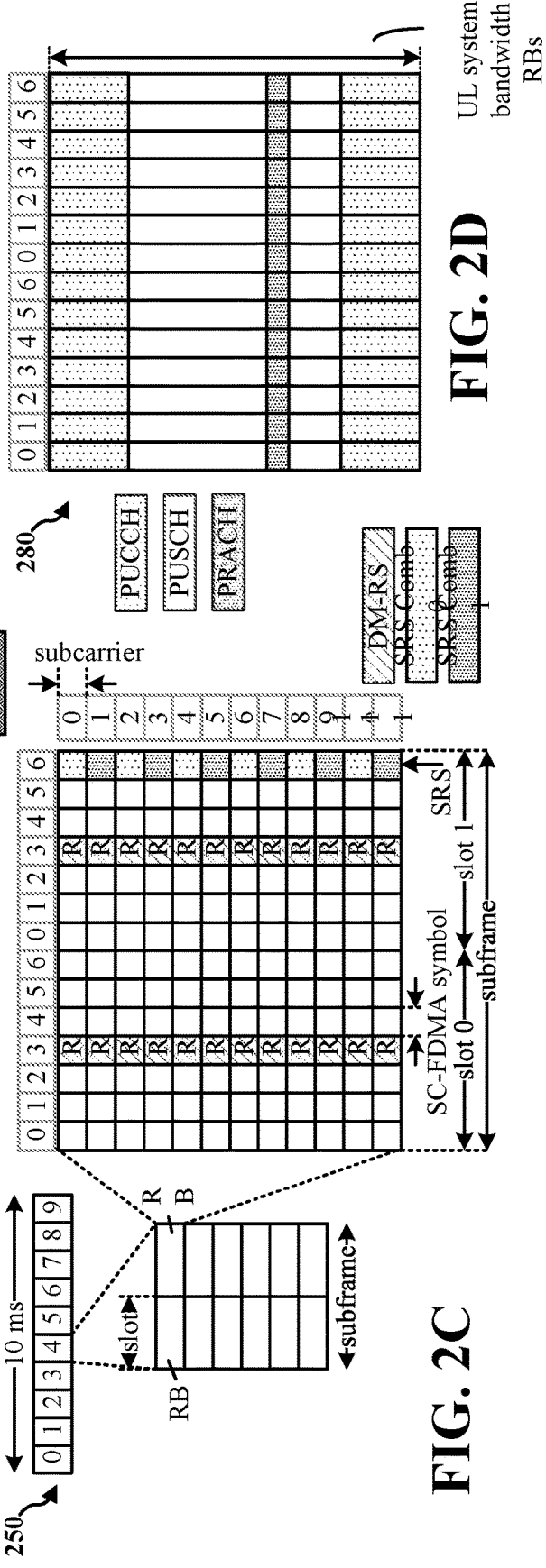

UPLINK ACK/NACK AND SR IN SHORT DURATIONS

CROSS-REFERENCE TO RELATED APPLICATIONS(S)

This application is a continuation of U.S. Non-provisional application Ser. No. 16/022,431, entitled "UPLINK ACK/NACK AND SR IN SHORT DURATION" and filed on Jun. 28, 2018, which claims the benefit of priority of U.S. Provisional Application Ser. No. 62/539,401, entitled "UPLINK ACK/NACK AND SR IN SHORT DURATIONS" and filed on Jul. 31, 2017, and U.S. Provisional Application Ser. No. 62/539,479, entitled "UPLINK ACK/NACK AND SR IN SHORT DURATIONS" and filed on Jul. 31, 2017, which are expressly incorporated by reference herein in their entirety.

BACKGROUND

Field

The present disclosure relates generally to communication systems, and more particularly, to wireless communication systems capable of transmitting and receiving short transmission bursts.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

There is a need to utilize resources in wireless communication systems more efficiently. In particular, new wireless communication systems may need to transmit data and control information in short bursts. Accordingly, being able to transmit data in short burst in an efficient manner and without adding complexity would be advantageous.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An important feature in new wireless communication systems (such as wireless communication systems that implement 5G NR) is to be able to support transmissions of small data packets thereby leading to a more efficient use of system resources. However, in order to be able to accomplish this, physical layers for these systems must be able to meet the target demands of these new wireless communication systems while supporting short transmission bursts. These transmission burst must also be capable of meeting the strict latency requirement of new wireless communication systems (e.g., 5G NR).

One of the problems with current 5G NR technology is that certain types of control information is not sent in a time efficient manner. This is a particular problem for short burst transmissions as it may require time segmentations of critical information that require complex solutions to coordinate the reception and transmission of this information between the base station and user equipment. For example, under the current agreement for 5G NR, scheduling requests (SRs) and acknowledgment (ACK)/negative ACKs (NACKs) are transmit separately in the time domain.

In an aspect of the disclosure, a method, a computer-readable medium, and an apparatus are provided. The apparatus may be user equipment configured to receive downlink control information (DCI) that indicates an allocated resource from a base station, receive data from the base station, generate a cyclically shifted sequence for transmission, the cyclically shifted sequence corresponding to a sequence that is cyclically shifted based on at least one of an ACK or NACK for the received data and a scheduling request (SR), and transmit the cyclically shifted sequence in the allocated resource within one symbol period of a slot of a subframe to the base station. Thus, by transmitting the SR and the ACK/NACK in one symbol period, control information for short burst transmissions can be provided in a more temporally efficient manner without adding excessive complexity to the UE.

In another aspect, a method, a computer-readable medium, and an apparatus are provided. The apparatus may be a base station configured to transmit downlink control information (DCI) that indicates an allocated resource to user equipment (UE), transmit data to the UE, and monitor for a SR and at least one of an ACK or a NACK in the allocated resource to the UE within one symbol period of a slot in a subframe, the at least one of the ACK or the NACK being in response to the transmitted data, and the SR and the at least one of the ACK or the NACK are indicated by a cyclically shifted sequence, the cyclically shifted sequence corresponding to a sequence that is cyclically shifted to indicate the SR and the at least one of the ACK or the NACK.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
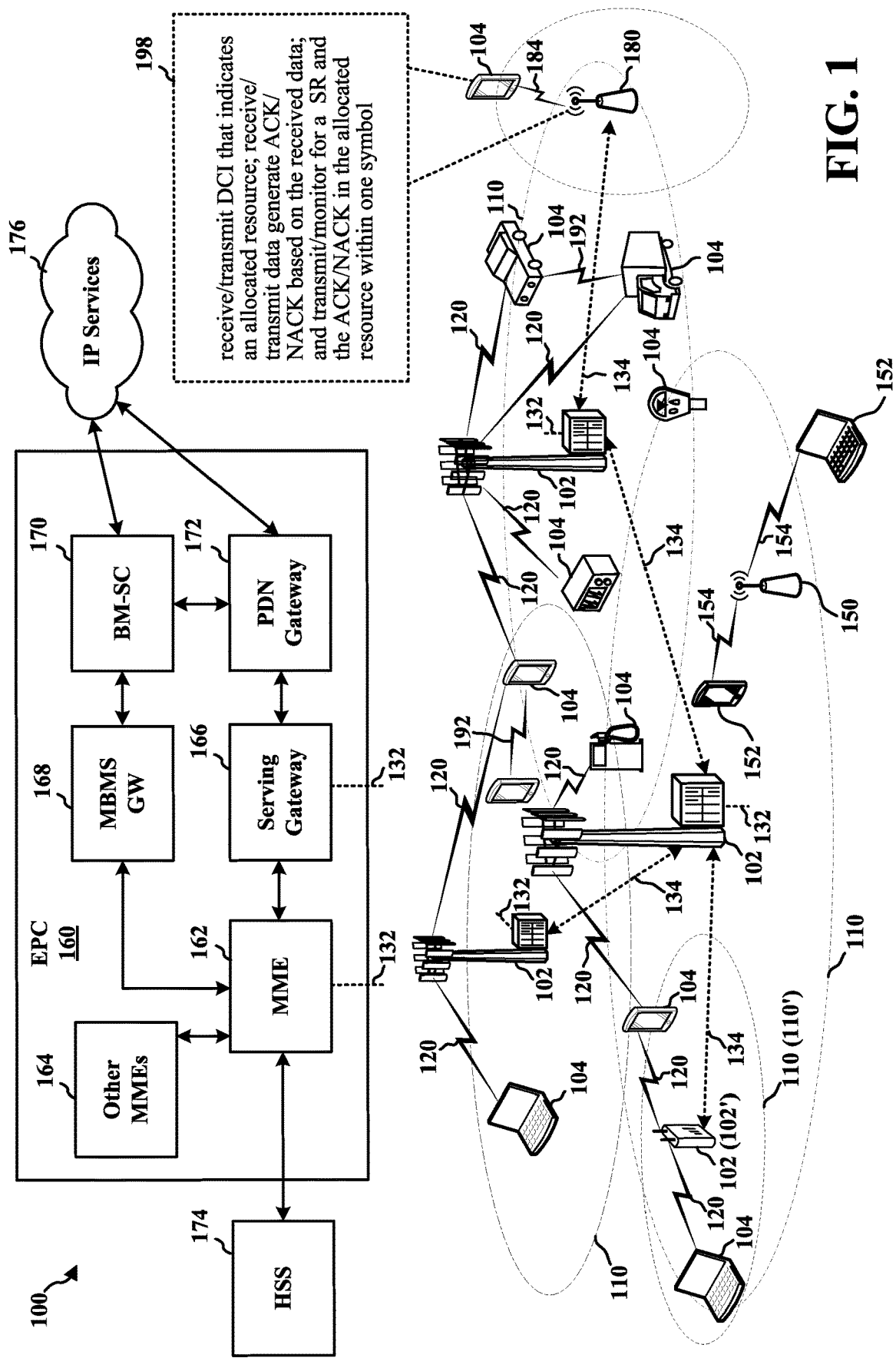
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 140 in communication with Wi-Fi stations (STAs) 152 via communication links 154 in a 5 GHz unlicensed frequency spectrum. When communicating in an unlicensed frequency spectrum, the STAs 152/AP 140 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 140. The small cell 102', employing NR in an unlicensed frequency spectrum, may boost coverage to and/or increase capacity of the access network.

The eNodeB (eNB) 180 may operate in millimeter wave (mmW) frequencies and/or near mmW frequencies in communication with the UE 104. When the eNB 180 operates in mmW or near mmW frequencies, the eNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a eNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

An important feature in new wireless communication systems (such as wireless communication systems that implement 5G NR) is to be able to support transmissions of small data packets thereby leading to a more efficient use of system resources. However, in order to be able to accomplish this, physical layers for these systems must be able to meet the target demands of these new wireless communication systems while supporting short transmission bursts.

One technique that allows for the use of short transmission burst is to utilize ULSB to transmit control information to the UE. Under the current agreement for 5G NR however, only one type of control information is transmitted during a ULSB. An FDM design has been proposed under the current agreement of 5G NR in order to transmit 3 or more bit of control information from the UE to base station during a ULSB. However, a sequence based design is utilized by the current agreement when less than three bits of control information are being transmit to the base station from the UE. This creates a cumbersome and inefficient circumstance when the UE needs to transmit an SR to the base station while also needing to transmitting an ACK/NACK.

In this disclosure however, systems and methods are disclosed that enable the UE to transmit and the base station to receive SR and ACK/NACK simultaneously in a ULSB without requiring significant increases in complexity. These solutions thus allow for more efficient use of system resources during short burst transmission (e.g., ULSB) since control information from the UE may be exchanged in a more temporally efficient manner. Additionally, the systems and methods disclosed herein allow the UE and base station to comply with the new latency requirements for 5G NR.

Referring again to FIG. 1, in certain aspects (see element 198), the base station 180 is configured to transmit DCI to the UE 104. The DCI may be transmit to the UE in a physical downlink control channel (PDCCH). For example, the base station 180 may provide header compression, ciphering, packet segmentation and reordering, multiplexing between logical and transport channels, and radio resource allocations to the UE 104. More specifically, the DCI may indicate an allocated resource for at least one of an ACK or a NACK. Furthermore, the DCI may indicate a second allocated resource in a physical downlink shared channel (PDSCH) for data to the UE 104. The base station 180 may be configured to transmit the data to the UE 104 in the PDSCH.

The UE 104 may thus be configured to receive the DCI from the base station 180. The UE 104 may also be configured to receive the data on the second allocated resource in the PDSCH from the base station 180. When the UE 104 receives the DCI from the base station 180, the UE 104 is configured to generate at least one of an ACK or NACK based on the received data. The at least one of the ACK or the NACK is provided by the UE 104 in response to the transmitted data from the base station 180. Additionally, the UE 104 may generate an SR in order to request new resources for a new transmission. For example, the SR may be triggered when UE 104 is synchronized with base station 180 but doesn't have UL resources allocated for a new type of control or data transmission.

With regard to the new techniques described herein, the UE 104 is configured to transmit the SR and the generated at least one of the ACK or the NACK in the allocated resource within one symbol. The symbol is provided in a slot of a subframe to the base station 180. The base station 180 thus is configured to monitor for the SR and the at least one of an ACK or NACK in the allocated resource. More particularly, this resource is allocated within the one symbol of the slot in the subframe. Thus, the base station 180 monitors for the at least one of the ACK or the NACK that was received from the UE 104 in response to the transmitted data. Accordingly, by providing the ACK or NACK and the SR within one symbol, the UE 104 can provide both the ACK or NACK and the SR to the base station 180 during a ULSB in a more efficient manner while complying with the new latency requirements for 5G NR.

When the UE 104 receives the DCI and thus generates the at least one of the ACK or NACK in response to the data from the base station 180, the base station 180 receives both the SR and the at least one of the ACK or NACK in the same one symbol in the slot of the subframe. However, as explained below, the UE 104 may not receive the DCI from the base station 180. Thus, the UE 104 may not generate the ACK or NACK in response. In certain implementations, as explained in further detail below, the resources allocated to provide the SR and the at least one of an ACK or NACK within one symbol are separable. For example, the UE 104 may be configured to transmit and the base station 180 may be configured to receive the SR in the one symbol of a first RB and the generated at least one of the ACK or the NACK in the one symbol of a second RB. Accordingly, when the UE 104 does not receive the DCI from the base station 180, the base station 180 may still receive the SR since the SR is transmitted in a different RB.

However, in other aspects, the resources allocated to provide the SR and the at least one of an ACK or NACK within one symbol are not separable, as explained in further detail below. For example, the SR and the at least one of the ACK or the NACK may be provided by the UE 104 as a joint payload. Thus the UE 104 may be configured to transmit and the base station 180 may be configured to receive the SR and the at least one of the ACK or the NACK jointly in the one symbol of a same set of resource blocks (RBs). As such, the SR and the at least one of the ACK or the NACK are inseparable and thus the UE 104 may not be able to transmit only SR in the allocated resource.

In this case, the base station 180 may be configured to determine that the SR and the at least one of the ACK or the NACK are unreceived in the allocated resource. Instead, the UE 104 may provide the SR in a second allocated resource allocated to the UE. As such, the base station 180 may also be configured to monitor for the SR (and determine whether a discontinuous transmission (DTX) occurred with respect to the ACK/NACK) in the second resource allocated to the UE 104.

FIG. 2A is a diagram 200 illustrating an example of a DL frame structure. FIG. 2B is a diagram 230 illustrating an example of channels within the DL frame structure. FIG. 2C is a diagram 240 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent RBs (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ ACK/NACK feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The PDSCH carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
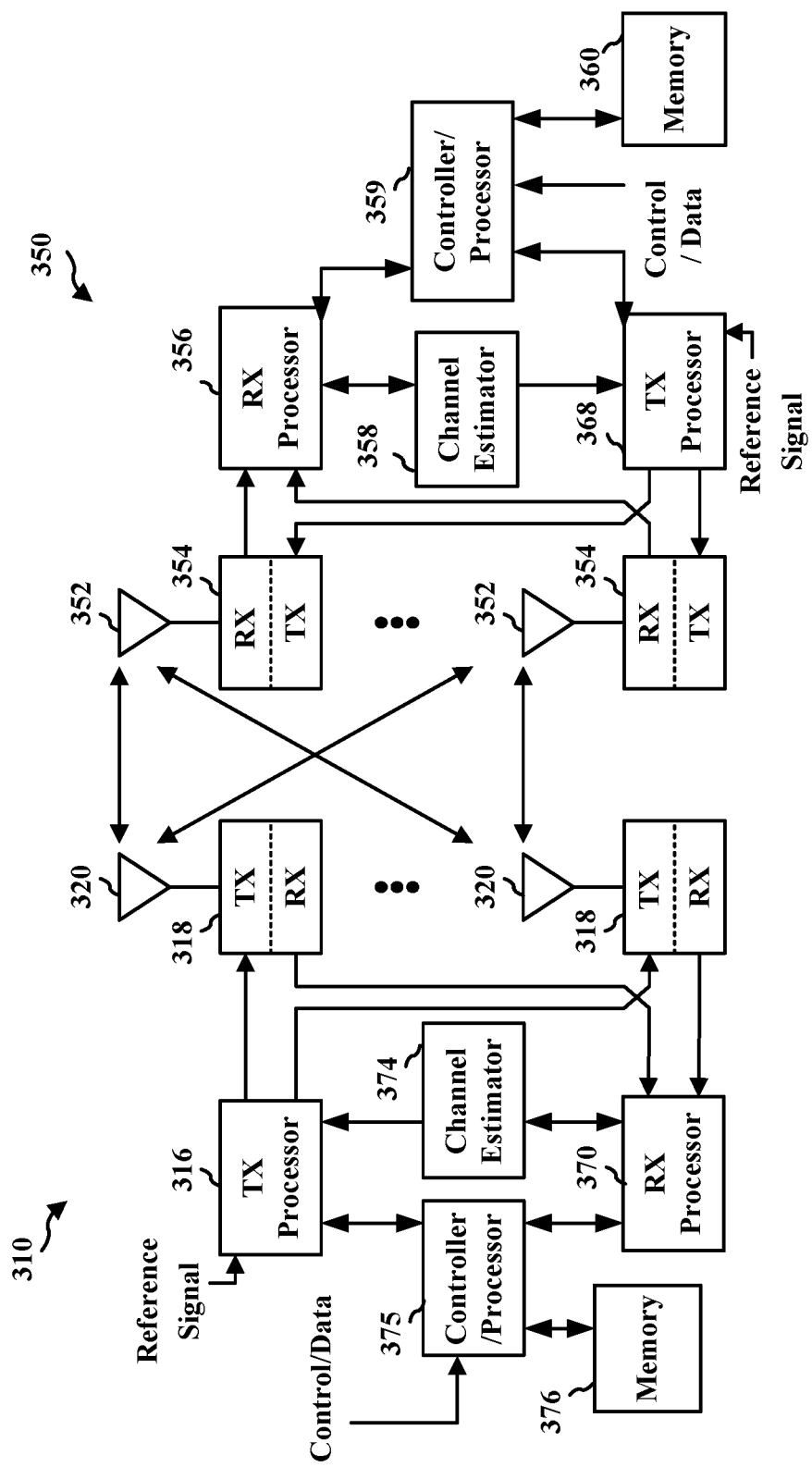
FIG. 3 is a diagram illustrating an example of a base station and user equipment in an access network.

FIG. 3 is a block diagram of a base station 310 in communication with a UE 340 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 340. Each spatial stream may then be provided to a different antenna 320 via a separate transmitter 318TX. Each transmitter 318TX may modulate an RF carrier with a respective spatial stream for transmission.

At the UE 340, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 340. If multiple spatial streams are destined for the UE 340, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 340. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 340. IP packets from the controller/processor 375 may be provided to the EPC 160. The controller/processor 375 is also responsible for error detection using an ACK and/or NACK protocol to support HARQ operations.

Figure 4:
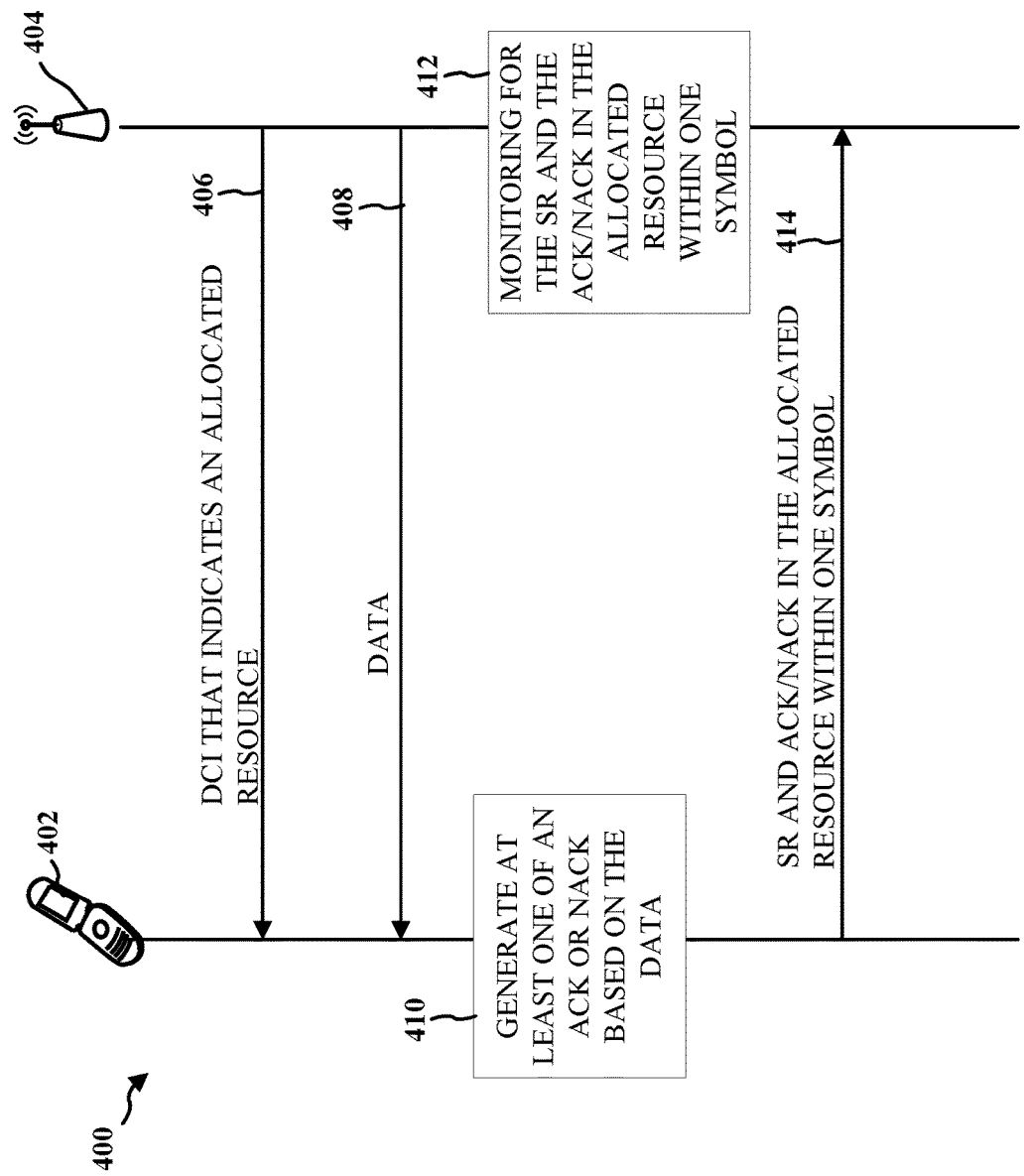
FIG. 4 is a call flow diagram illustrating an implementation of providing both a scheduling request and at least one acknowledgement or negative acknowledgement within one symbol.

FIG. 4 is an exemplary call flow diagram 400 that illustrates a call flow 400 between a UE 402 and a base station 404 when a new technique of utilizing UL short burst (ULSB) are implemented. As shown in FIG. 4, the base station 404 transmits and the UE 402 receives DCI within a PDCCH (procedure 406). The DCI may indicate an allocated resource in a PUCCH for at least one of an ACK/NACK (sometimes referred to as "ACK/NACK" in the disclosure) and a second allocated resource in a PDSCH to transmit DL data. The base station 404 then transmits and the UE then receives data in the second allocated resource of the PDSCH (procedure 408).

When the UE 402 receives the data in the second allocated resource of the PDSCH from the base station 404, the UE 402 generates at least one of an ACK or NACK based on the received data from the base station 404 (procedure 410). Accordingly, the at least one of the ACK or the NACK is provided by the UE 402 in response to the transmitted data from the base station 404. When UE 402 fails to decode PDCCH and obtain the DCI, the UE 402 does not try to decode the corresponding PDSCH with the data. Hence, the UE 402 will not transmit ACK/NACK and thus a DTX occurs when the UE 402 fails to transmit ACK/NACK even though base station 404 is expecting it. The base station 404 therefore needs to perform DTX detection.

In addition, the UE 402 may generate an SR in order to request new resources for a new transmission. For example, the SR may be triggered when UE 402 is synchronized with base station 404 but doesn't have UL resources allocated for a new type of control or data transmission. The base station 404 thus monitors for SR and at least one of the ACK/NACK in the allocated resource within the one symbol of the slot in the subframe (procedure 412).

The UE 402 is configured to transmit the SR and the at least one of the ACK or the NACK in the allocated resource of the PUCCH within one symbol of a slot in a subframe (procedure 414). The ACK/NACK is received by the base station in response to the data transmitted in procedure 410 by the base station 404. When the UE 402 has appropriately received the DCI within the PDCCH, the base station 404 receives the SR and the at least one of the ACK or NACK in the resource allocated from the UE 402 at procedure 412. When UE 402 fails to receive the DCI within the PDCCH, the UE 402 will not transmit ACK/NACK together with SR in the new allocated resource. If UE 402 needs to transmit SR, the UE 402 will then transmit SR on the original SR resource designated under the current agreement of 5G NR. Otherwise, the UE 402 transmits nothing.

Accordingly, by providing the at least one of the ACK or NACK and the SR within one symbol of a slot of a subframe, the UE 402 can provide both the ACK or NACK and the SR to the base station 404 during a ULSB in a more efficient manner while complying with the new latency requirements for 5G NR. Various aspects are described in this disclosure for providing the ACK/NACK within the one symbol of the allocated resource. For instance, in some aspects, sequence base designs may be utilized to provide both the SR and the ACK/NACK within the one symbol.

In one example, the SR is transmitted by the UE 402 and received by the base station 404 in the one symbol of a first RB while the at least one of the ACK or the NACK is transmitted in the one symbol of a second RB where the first RB and the second RB are non-adjacent with respect to the frequency domain. In one implementation, the first RB may be the original RB for an SR under the current agreement and the second RB is an RB in a newly allocated resource. The channelization of the SR and the ACK/NACK on the first and second RB is the same as the channelization of the SR or ACK/NACK transmitted by themselves.

In one aspect, the SR is transmitted by the UE 402 and received by the base station 404 using on-off keying (OOK) with a first sequence in the one symbol of the first RB. Additionally, the at least one of the ACK or the NACK is transmitted by the UE 402 and received by the base station 404 in a second sequence of $2^n$ sequences in the one symbol of the second RB, where n is a number of bits of the at least one of the ACK or the NACK. However, there are sometimes issues with peak to average power ratio (PAPR) and intermodulation leakage when the first RB and the second RB are non-adjacent with respect to the frequency domain.

Accordingly, in another aspect, the first RB and the second RB are adjacent with respect to the frequency domain. Like in the previously described aspect, the SR is transmitted by the UE 402 and received by the base station 404 using OOK with a first sequence in the first RB that contains the one symbol. The at least one of the ACK or the NACK is transmitted by the UE 402 and received by the base station 404 in a second sequence of $2^n$ sequences of the second RB that contains the one symbol. More specifically, the first sequence is a first base sequence with a first cyclic shift in a time domain and the second sequence is a second base sequence with a second cyclic shift in the time domain, the second cyclic shift being one of $2^n$ cyclic shifts.

When the first RB and the second RB are adjacent with respect to the frequency domain, there is very little intermodulation leakage. Also, in general, the PAPR can be maintained low as well assuming that the sequences for the SR and the ACK/NACK are selected appropriately. The first base sequence is selected such that the PAPR associated with transmitting the first base sequence by itself is less than a first threshold. In addition, the second base sequence is selected such that a PAPR associated with transmitting the second base sequence by itself is less than the first threshold. For example, the first threshold may be 4 dB. Furthermore, a concatenation of the first base sequence and the second base sequence are selected such that a PAPR associated with receiving the concatenation is less than a second threshold. For example, the second threshold may be 6 dB. If such as base sequences can be found, then the PAPR can be maintained low enough while providing the first and second RBs adjacently.

In still another aspect, rather than providing the SR and ACK/NACK in different RBs and transmit SR and ACK/NACK with their individual channelization as each SR or ACK/NACK transmitted by itself, the SR and the at least one of the ACK or the NACK are transmitted by the UE 402 and received by the base station 404 jointly in the one symbol of the same set of RBs. The same set of RBs may be determined from the DCI. In this case, a sequence based design may be used. For example, the SR and the at least one of the ACK or the NACK are transmitted by the UE 402 and received by the base station 404 in one sequence of $2^{n+1}$ sequences in the one symbol of the set of RBs (where n is a number of bits of the at least one of the ACK or the NACK). This one sequence is a base sequence with one of $2^{n+1}$ cyclic shifts of the base sequence. The $2^{n+1}$ sequences include a first set of $2^n$ sequences for SR equal to 0 (that is SR is negative) and a second set of $2^n$ sequences for SR equal to 1 (that is SR is positive). Thus, if the one sequence selected is from the first set of $2^n$ sequences then SR is equal to 0 while if the one sequence selected is from the second set of $2^n$ sequences then SR is equal to 1. When a sequence length (L) is an integer multiple of the number of cyclic shifts, the $2^{n+1}$ cyclic shifts may be $2^{n+1}$ integer cyclic shifts. The minimum shift distance among the set of the $2^{n+1}$ cyclic shifts may be $L/2^{n+1}$. However, when a sequence length is not an integer multiple of the number of cyclic shifts, the $2^{n+1}$ cyclic shifts comprise $2^{n+1}$ fractional cyclic shifts such that a minimum cyclic shift distance between each of the $2^{n+1}$ fractional cyclic shifts is equal to L divided by $2^{n+1}$ where L is a sequence length of each of the $2^{n+1}$ fractional cyclic shifts. Alternatively, when a sequence length is not an integer multiple of the number of cyclic shifts, the $2^{n+1}$ cyclic shifts comprise $2^{n+1}$ integer cyclic shifts such that a minimum cyclic shift distance between each of the $2^{n+1}$ cyclic shifts is equal to a floor operation of $L/2^{n+1}$.

Furthermore, the first set of $2^n$ sequences each represent the different values of the ACK/NACK and the second set of $2^n$ sequences also each represent the different values of the ACK/NACK. Thus, both the value of SR and the value of the ACK/NACK are provided by selecting the one sequence from the $2^{n+1}$ sequences. To maximize the error performance, the first set of $2^n$ sequences and the second set of $2^n$ sequences may be interlaced with respect to the cyclic shifts of the base sequence to maximize a mutual distance between each sequence in the first set of $2^n$ sequences and each sequence in the second set of $2^n$ sequences as illustrated in FIG. 7C for 1 bit of ACK and SR, and in FIG. 7D for 2 bit of ACK and SR. In one aspect, the UE 402 may determine the cyclic shifts of the base sequence assigned to the different values of the ACK/NACK when the SR is positive based on a mapping of the values of the ACK/NACK to the cyclic shift values. For example, when SR is positive and the ACK is one bit (i.e., n=1), the UE 402 may determine the cyclic shift of the base sequence representing the one-bit ACK by mapping the one-bit ACK value to one of two cyclic shifts selected from the second set of $2^n$ sequences. Alternatively, when SR is positive and the ACK is two bits (i.e., n=2), the UE 402 may determine the cyclic shift of the base sequence representing the two-bit ACK by mapping the two-bit ACK value to one of four cyclic shifts selected from the second set of $2^n$ sequences.

In still yet another aspect, the at least one of the ACK or the NACK are received in one sequence of $2^n$ sequences in the one symbol of the set of RBs (where n is a number of bits of the at least one of the ACK or the NACK). To indicate the ACK/NACK value, the one sequence is a base sequence with one of $2^n$ cyclic shifts of the base sequence. For the value of SR, the one sequence is received in a first RB of the set of RBs when SR equal to 0 and the one sequence is received in a second RB of the set of RBs when SR equal to 1.

With regard to this aspect, the one of the $2^n$ sequences for ACK/NACK may thus be transmitted on different RB depending on SR value (i.e., transmitted on first RB for SR=0, and second RB for SR=1). Thus, the $2^n$ sequences on first RB or second RB could be the same since the two RBs will not be used simultaneously. Unlike the aspects where SR is transmitted in one RB and the ACK/NACK is transmitted in another RB, this aspect may use a minimum of 2 RBs of a new allocated resource to transmit both ACK and SR.

In yet another aspect, the SR and the at least one of the ACK or the NACK are transmitted by the UE 402 and received by the base station 404 jointly in the one symbol within three bits of UCI. More specifically, the bit of the SR and the bit of the ACK/NACK may be combined into a joint payload and may be encoded and transmitted in a way similar to a normal 3 bits of payload with the same type of UCI. While the FDM based design of demodulation reference signal (DMRS) and data subcarriers with CP-OFDM waveform techniques of the current agreement 5G NR may be utilized, the joint payload of the combined SR and ACK/NACK bits will include different types of UCI.

Finally, still yet another aspect, a 1 bit ACK/NACK may be a 1 bit bundled ACK/NACK and thus is derived from a pure 2 or more bit ACK/NACK. In other words, the 2 or more bits in the 2 or more bits ACK/NACK are ANDed to produce the 1 bit bundled ACK/NACK. The UE 402 provides the combined SR and 1 bit bundled ACK/NACK with the 4 sequences (as described below with respect to FIG. 7C.)

As explained in further detail below in some aspects, the UE 402 may not receive the DCI within the PDCCH from the base station 404. With respect to the above described aspects, the SR is still simply transmitted by the UE 402 in its originally assigned RB for SR only transmission, and the base station 404 still receives the SR from the UE 402 even through the UE 402 does not provide the ACK/NACK. If SR is received in the original SR RB, an eNB (i.e., base station 404) may declare DTX for ACK/NACK and positive SR. If SR is received in neither original SR RB or the allocated RB, the eNB may declare DTX for ACK/NACK and negative SR.

However, with respect to the aspects where the SR and the at least one of the ACK or the NACK are provided by the UE 402 to the base station 404 as a joint payload, the resources allocated to provide the SR and the at least one of an ACK or NACK within one symbol are not separable. Therefore, as explained in further detail below, the UE 402 may be configured to transmit and the base station 404 may be configured to receive the SR in a second resource (e.g., the original SR resource in the current agreement for 5G NR) if the ACK/NACK is DTX.

Figure 5:
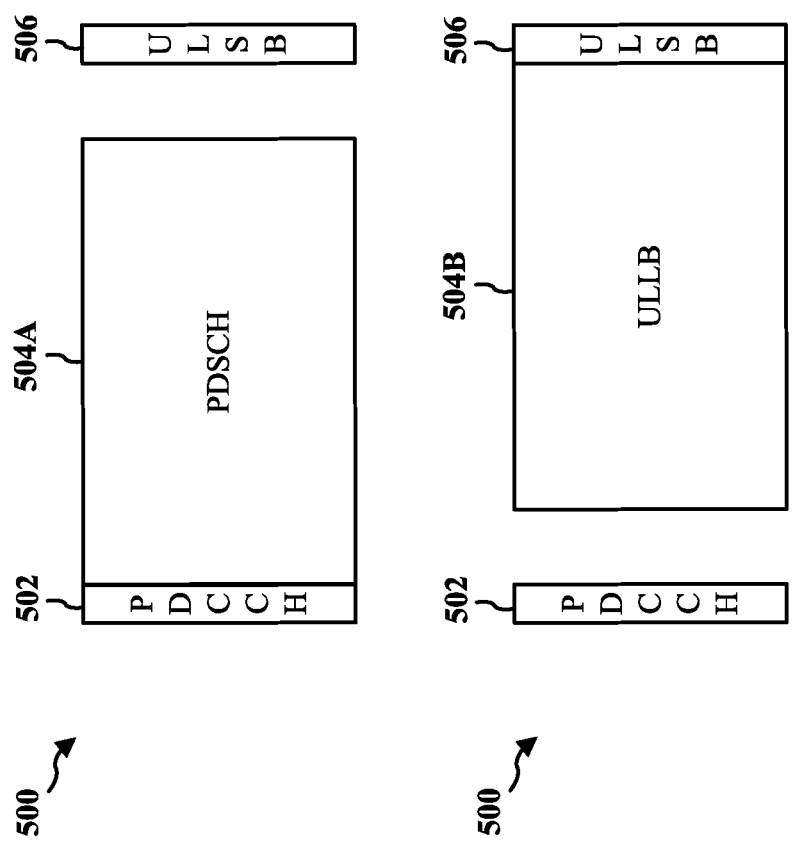
FIG. 5 are generalized TDD configuration for transmitting control information and data between user equipment and a base station.

FIG. 5 illustrates an example of TDD configurations 400 that may be used to transmit data between the UE 402 and the base station 404. In new telecommunication standards, such as 5G NR, TDD configurations for transmitting data may be provided in different arrangements depending on whether the TDD configuration is being used primarily to transmit UL data from the UE 402 to the base station 404 or primarily to transmit DL data from the base station 404 to the UE 402. As shown in FIG. 5, both of the TDD configurations 400 begin with a section 402 that is utilized to transmit DCI within the PDCCH from the base station 404 to the UE 402. The DCI may indicate an allocated resources in the PUCCH and the PDSCH for the UE 402. The base station 404 may transmit DCI for one or more other UEs (not shown) during section 402 (procedure 406). Each of the TDD configurations 400 then has center sections 404A, 404B used to exchange data between the UE 402 and the base station 404 (procedure 408).

For example, the TDD configuration 400 that includes section 404A is a DL centered. In the symbols provided during section 404A, the base station 404 transmits data within the PDSCH to the UE 402. Thus, one implementation of procedure 408 in FIG. 5 has the base station 404 transmitting data to the UE 402 during section 404A. As such, the UE 402 thus receives the data within the PDSCH transmitted from the base station 404 during section 404A. It should be noted that the base station 404 may also transmit data to one or more other UEs (not shown) during section 404A.

On the other hand, the TDD configuration 400 that includes section 404B is a UL centered. In the symbols provided during section 404B, the UE 402 transmits data to the base station 404 by providing a UL long burst (ULLB) during section 404B. Thus, one implementation of procedure 408 in FIG. 5 has the UE 402 transmits data to the base station 404 during section 404B. As such, the base station 404 thus receives the data provided by the ULLB from the UE 402 during section 404B. It should be noted that the base station 404 may also receive data from one or more other UEs (not shown) during section 404B.

As shown in FIG. 5, each of the TDD configurations 400 ends with a section 406 where a UL short burst (ULSB) is provided by the UE 402 to the base station 404 (procedure 510). UCI is provided by the ULSB, which may be provided within the PUCCH. In each of the TDD configurations 400 shown in FIG. 5, the ULSB (and thus section 406) is provided for one symbol. However, the ULSB may be for 1 or 2 symbols depending on the UCI data requirements.

In the current agreement for 5G NR, when section 406 of the TDD configurations 400 is one symbol and carries 3 or more bit of UCI, an FDM design has been proposed to transmit the UCI.

However, transmissions of ACK/NACK and SR are mutually exclusive under the current agreement and ACK/NACK is provided as 1 or 2 bits and SR is provided as 1 bit. Thus, under the current agreement as working assumption for 5G NR, sequence based designs are used so that the UE 402 provides and the base station 404 receives the ACK/NACK or SR during section 406 of each of the TDD configurations 400 in response to the data. Furthermore, under the current agreement as working assumption, the UE 402 may either provide ACK/NACK (either 1 bit or 2 bits) or provide SR exclusively in the sections 406 of the TDD configurations 400. More specifically, during section 406 of each of the TDD configurations 400, the UE 402 may transmit only SR (and not transmit ACK/NACK) within the PUCCH by providing the ULSB.

Thus, under the current agreement, the base station 404 receives exclusively either ACK/NACK (either 1 bit or 2 bits) or receives SR in the sections 406 of the TDD configurations 400. To do this, the base station 404 may assign 1 sequence within an RB for SR to the UE 402. The UE 402 uses the 1 sequence and uses on-off keying (OOK) to distinguish between a positive value and a negative value of the SR. As such, the base station 404 is configured to determine whether the SR has a positive or negative value based on the OOK for the SR. Since the SR of the UE 402 is provided by 1 sequence, up to 12 different UEs may be multiplexed per RB by the base station 404.

On the other hand, during section 406 of each of the TDD configurations 400, the UE 402 may transmit only ACK/NACK (and not transmit SR) within the PUCCH by providing the ULSB. If the ACK/NACK is a 1 bit ACK/NACK, the base station 404 selects 2 sequences for the UE 402 where each of the 2 sequences represents a different possible value of the 1 bit ACK/NACK. Each of the 2 bit sequences is based on the same base sequence. However, the 2 sequences for the 1 bit ACK/NACK have 2 different cyclic shifts. Each of the 2 cyclic shifts may be selected by the base station 404 to maximize the cyclic shift distance and thereby minimize interference between the 2 sequences. Since 2 different sequences are used for the 1 bit ACK/NACK, up to 6 different UEs may be multiplexed per RB by the base station 404.

If the ACK/NACK is a 2 bit ACK/NACK, the base station 404 selects 4 sequences for the UE 402 where each of the 4 sequences represents a different possible value of the 2 bit ACK/NACK. Each of the 4 bit sequences is based on the same base sequence. However, the 4 sequences for the 2 bit ACK/NACK have 4 different cyclic shifts. Each of the 4 cyclic shifts may be selected by the base station 404 to maximize the cyclic shift distance and thereby minimize interference between the 4 sequences. Since 4 different sequences are used for the 2 bit ACK/NACK, up to 3 different UEs may be multiplexed per RB by the base station 404.

It would be advantageous however for the UE 402 to transmit both SR and ACK/NACK in the same slot while avoiding peak to average power ratio (PAPR) and intermodulation leakage. Unfortunately, the current agreement for 5G NR does not specify how SR and ACK/NACK can both be transmit during the same slot.

Figure 6:
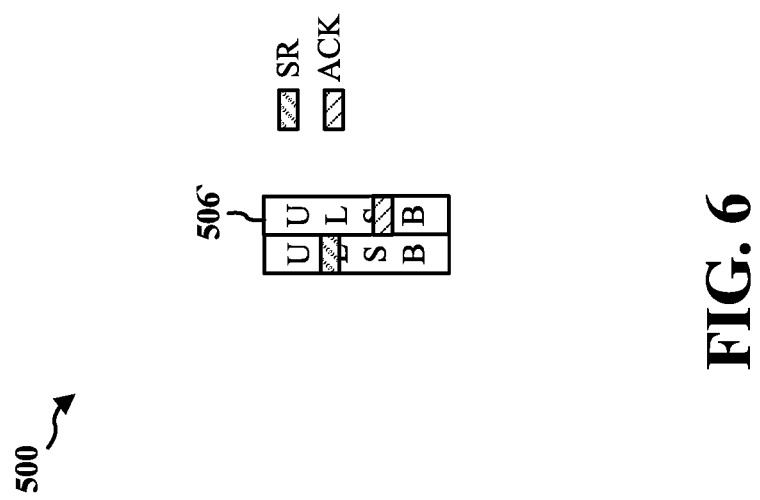
FIG. 6 illustrates an implementation of providing both a scheduling request and at least one acknowledgement or negative acknowledgement within two symbols.

FIG. 6 illustrates an implementation where the UE 402 transmits both ACK/NACK and SR by providing the ULSB within the PUCCH in a section 506' at the end of a time slot, similar to the section 506 of the time TDD configurations 500 shown in FIG. 5. Unlike section 506 (which was provided for one symbol) however, section 506' has 2 adjacent symbols. In this implementation, the base station 404 allocates one of the symbols in section 506' to the UE 402 for SR and the other one of the symbols in section 506' to the UE 402 for ACK/NACK. The UE 402 transmits the ULSB for the 2 adjacent symbols at the end of the slot in section 506'. Accordingly, the UE 402 is configured to transmit the SR in one symbol and the ACK/NACK (either 1 bit ACK/NACK or 2 bit ACK/NACK) in the other symbol of section 506'.

As such, the symbols of section 506' are essentially treated as a separate channels. Thus, the UE 402 is configured to provide the symbol SR in one of the symbols of section 506', using 1 sequence in the same manner as explained above for the current agreement. The UE 402 is configured to provide the ACK/NACK in the other symbol, either as 2 sequences for the 1 bit ACK/NACK or as 4 sequences for the 2 bit ACK/NACK, in the same manner as explained above for the current agreement. The base station 404 is thus configured to receive the symbol SR in one of the symbols of section 506'. The base station 404 is also configured to receive the ACK/NACK in the other symbol (either as 2 sequences for the 1 bit ACK/NACK or as 4 sequences for the 2 bit ACK/NACK) in the same manner as explained above for the current agreement.

It should be noted that in the specific example shown in FIG. 6 the UE 402 provides the SR in the second to last symbol of section 506' while the ACK/NACK is provided in the last symbol. Alternatively however, the UE 402 may provide the ACK/NACK in the second to last symbol of section 506' while the SR is provided in the last symbol. It would be advantageous for the UE 402 to transmit SR and ACK/NACK in one symbol since 2 symbols may not always be available for UL at the end of a slot.

Figure 7A:
FIG. 7A-7E illustrate implementations of providing both a scheduling request and at least one acknowledgement or negative acknowledgement within one symbol.
Figure 7B:
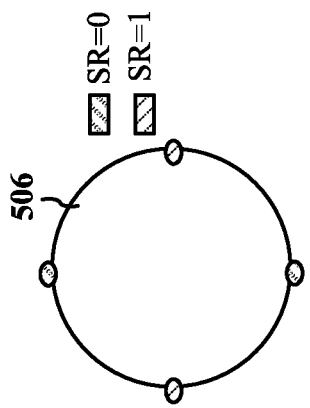
Figure 7C:
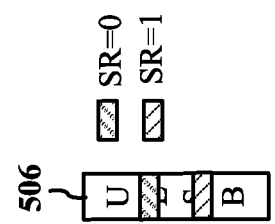

Accordingly, FIGS. 7A-7E illustrate examples of implementations of procedures 412/414 where the UE 402 transmits both ACK/NACK and SR in one symbol of section 506 at the end of the TDD configurations 500. More specifically, FIGS. 7A-7B illustrate two different implementations of procedures 412/414 where the UE 402 is configured to transmit SR and ACK/NACK in two different RBs, where the two different RBs contain the same one symbol provided in section 506. Thus, the base station 404 is configured to allocate one RB to the UE 402 for the SR and allocate the other RB to the UE 402 for the ACK/NACK. The SR RB may be semi-statically configured. Hence, for current slot, a PDCCH transmission from eNB to the UE with DCI containing assignment for the SR RB may not be required. The ACK RB may require a PDCCH transmission with DCI containing assignment. The assignment may be an explicit indication of an ACK resource or an implicit mapping from PDCCH resource to ACK resource. Accordingly, the base station 404 is configured to receive the SR in one RB of section 506 while the UE 402 is configured to receive the ACK/NACK in the other RB of section 506.

Referring specifically to FIG. 7A, FIG. 7A illustrates an example of section 506 where SR is transmit by the UE 402 in one RB that contains the one symbol and ACK/NACK is transmit by the UE 402 in another RB that contains the one symbol, wherein the two RBs are non-adjacent in the frequency domain. As such, the base station 404 is configured to allocate one RB to the UE 402 for the SR and the base station 404 is configured to allocate the other RB to the UE 402 for ACK/NACK. The two RBs allocated by the base station 404 are non-adjacent with respect to the frequency domain. Furthermore, as shown in FIG. 7A, the section 506 of the TDD configurations 500 provide both ACK/NACK (either 1 bit or 2 bits) and SR in the same symbol of section 506. More specifically, during section 506 of each of the TDD configurations 500, the UE 402 may transmits SR and ACK/NACK within the PUCCH by providing the ULSB. The UE 402 transmits the SR using 1 sequence in one RB within the one symbol and uses on-off keying (OOK) to distinguish between a positive value and a negative value of the SR.

Furthermore, within the same one symbol of section 506 that includes the SR, the UE 402 may also transmit ACK/NACK in the other RB within the PUCCH by providing the ULSB. If the ACK/NACK is a 1 bit ACK/NACK, 2 sequences in the other RB are used where each of the 2 sequences represents a different possible value of the 1 bit ACK/NACK. Each of the 2 bit sequences in the other RB is based on the same base sequence. However, the 2 sequences in the other RB for the 1 bit ACK/NACK have 2 different cyclic shifts. Each of the 2 cyclic shifts is selected to maximize the cyclic shift distance and thereby minimize interference between the 2 sequences.

If the ACK/NACK is a 2 bit ACK/NACK, 4 sequences in the other RB are used where each of the 4 sequences in the other RB represents a different possible value of the 2 bit ACK/NACK. Each of the 4 bit sequences in the other RB is based on the same base sequence. However, the 4 sequences for the 2 bit ACK/NACK in the other RB have 4 different cyclic shifts. Each of the 4 cyclic shifts in the other RB may be selected to maximize the cyclic shift distance and thereby minimize interference between the 4 sequences.

It should be noted that the implementation described by FIG. 7A generally may have a higher PAPR and greater intermodulation leakage than the implementation shown in FIG. 7B. Accordingly, in some circumstances, the UE 402 may have to back off its transceiver in certain circumstances to avoid issues with PAPR and intermodulation leakage when utilizing the sequence scheme described in FIG. 7A.

FIG. 7B generally allows for the PAPR and intermodulation issues to be improved. With regards to FIG. 7B, FIG. 7B illustrates an example of section 506 where SR is transmit by the UE 402 in one RB and ACK/NACK is transmit by the UE 402 in another RB, wherein the two different RBs are adjacent in the frequency domain. As such, the base station 404 is configured to allocate one RB to the UE 402 for the SR and the base station 404 is configured to allocate the other RB to the UE 402 for ACK/NACK.

Furthermore, as shown in FIG. 7B, the section 506 of the TDD configurations 500 provide both ACK/NACK (either 1 bit or 2 bits) and SR in the same one symbol of section 506. More specifically, during section 506 of each of the TDD configurations 500, the UE 402 may transmit SR and ACK/NACK within the PUCCH by providing the ULSB.

In general, the RB used to provide the SR in the UL is semi-statically allocated by the base station 404 for the UE 402. However, ACK/NACK resources in the UL are not. Thus, when the implementation described by FIG. 7B is to be used, the other RB to be used to provide the ACK/NACK may be allocated dynamically allocated by the base station 404 and assigned to the UE 402. There is very little intermodulation leakage when adjacent RBs are used to transmit SR and ACK/NACK in the same symbol of section 506. However, PAPR can vary. Thus, the base station 404 may dynamically allocate either the adjacent RB for ACK/NACK at lower frequencies (described as [SR+ACK/NACK]) or the adjacent RB for ACK/NACK at higher frequencies (described as [ACK/NACK+SR]) depending on PAPR. It should be noted that the specific example shown in FIG. 7B illustrates [SR+ACK/NACK]. However, this is simply an example and the base station 404 may instead allocate [ACK/NACK+SR] if this allocation will minimize the PAPR.

The base station 404 may perform a computerized search so that the combined sequences for SR and ACK/NACK using adjacent RBs minimizes the PAPR. The combined sequences for SR and ACK/NACK using adjacent RBs may be [SR+ACK/NACK] or [ACK/NACK+SR], which the base station 404 may select based on which combined sequences for SR and ACK/NACK have a reduced PAPR.

To perform the computerized search, the base station 404 may iterate though the possible base sequences for SR (denoted as X) and the possible base sequences for ACK/NACK (denoted as Y) to select the base sequence X and the base sequence Y with reduced PAPR. A length of the base sequence X is denoted as N and a length of the base sequence Y is denoted as M. X and Y may be different while N and M may be either the same or different.

The sequence for SR in its RB will be the base sequence X with an assigned cyclic shift. The sequences for ACK/NACK within the other adjacent RB may be the base sequence Y with one of the assigned cyclic shifts. For example, for the 1 bit ACK/NACK, 2 sequences in the other adjacent RB will be used which are determined from the base sequence Y with two different cyclic shifts. For the 2 bit ACK/NACK, 4 sequences in the other adjacent RB will be used which are determined from the base sequence Y with four different cyclic shifts. Again, the combined sequences for SR and ACK/NACK may be provided as [SR+ACK/NACK] or [ACK/NACK+SR].

To find the combined sequences for SR and ACK/NACK in adjacent RBs with a reduced PAPR, the base station 404 searches through each possible base sequence X and each possible base sequence Y such that: 1) for the base sequence X transmitted alone, the base sequence X has a PAPR below a first PAPR threshold (e.g. below z dB where z may for example equal 4 dB), 2) for the base sequence Y transmitted alone, the base sequence Y has a PAPR below the first PAPR threshold, and 3) for the concatenated sequences, the concatenated sequences have a PAPR below a second PAPR threshold, [e.g., below z+w dB (e.g., w=3 dB)]. In one example, the base station 404 may restrict the sequence for SR to be the selected base sequence X and the sequences (for a 2 bit ACK/NACK) may be any of 4 sequences from the selected base sequence Y with 4 different cyclic shifts having a M/4 cyclic shift distance (0, M/4, M/2, 3M/4). In another example, if the sequence for SR used is the selected base sequence X with cyclic shift s, the base station 404 may assign the sequences for ACK/NACK with cyclic shifts s, (M/4+s) % M, (M/2+s) % M, (3M/4+s) % M).

If there are only combined sequences that are [SR+ACK/NACK] with low PAPR, then [SR+ACK/NACK] is selected by the base station 404. If there are only combined sequences that are [ACK/NACK+SR] with low PAPR, then [ACK/NACK+SR] is selected by the base station 404. If there are combined sequences that are [SR+ACK/NACK] and [ACK/NACK+SR] with low PAPR, then the base station 404 may select either [SR+ACK/NACK] or [ACK/NACK+SR].

Figure 7D:
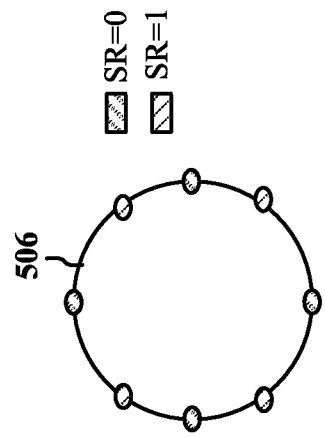
Figure 7E:
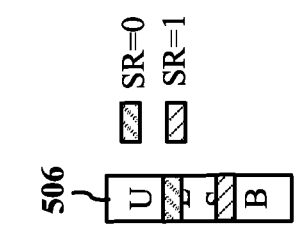

However, it is possible that the UE 402 may not be able to find combined sequences with a low enough PAPR. In this case, the UE 402 may be configured to provide both the SR and the ACK/NACK in a joint payload. FIGS. 7C-7E illustrate two different implementations of procedures 412/414 where the UE 402 is configured to transmit SR and ACK/NACK as a joint payload using different sequences. It should be noted that the implementations described in FIGS. 7C-7E are new allocations that assume that the UE 402 received the DCI transmitted by the base station 404 within the PDCCH of the sections 602. If the UE 402 does not receive the DCI transmitted by the base station 404 within the PDCCH of the sections 602, then SR is transmitted by the UE 402 in the semi-statically allocated SR RB in accordance with the current agreement for 5G NR (described above), as explained in further detail below.

With regards to FIG. 7C, FIG. 7C illustrates an example of section 506 where SR and a 1 bit ACK/NACK are transmitted by the UE 402 as a joint payload (assuming the UE 402 received the DCI within the PDCCH). As such, the UE 402 uses 4 sequences to represent the different values of the combined 2 bit payload for the combination of SR and ACK/NACK. As shown in FIG. 7C, each of the 4 sequences has a different cyclic shift. The UE 402 uses a first 2 of the 4 sequences to indicate that SR is 1. Thus, when either of the first 2 sequences are used by the UE 402, the base station 404 is configured to determine that SR is 1. Each of the first 2 sequences indicate different values of the 1 bit ACK/NACK. For example, one of the first 2 sequences represents that the 1 bit ACK/NACK is equal to 1 while the other one of the first 2 sequences represents that the 1 bit ACK/NACK is equal to 0. On the other hand, the UE 402 uses a second 2 of the 4 sequences to indicate that SR is 0. Thus, when either of the second 2 sequences are used by the UE 402, the base station 404 is configured to determine that SR is 0. Each of the second 2 sequences indicate different values of the 1 bit ACK/NACK, just like the first 2 sequences. For example, one of the second 2 sequences represents that the 1 bit ACK/NACK is equal to 1 while the other one of the first 2 sequences represents that the 1 bit ACK/NACK is equal to 0. The 4 sequences are interlaced to maximize the cyclic shift distance between the different values of the joint payload. As shown in FIG. 7C, the cyclic shifts correspond to a circle with $2\pi$ or $-2\pi$ radians.

The specific 1 bit ACK/NACK described above with respect to FIG. 7C is a pure 1 bit ACK/NACK in that the 1 bit ACK/NACK true represents only 1 bit of ACK/NACK information. However, in alternative implementations, the 1 bit ACK/NACK described with respect to FIG. 7C is a 1 bit bundled ACK/NACK and thus is derived from a pure 2 bit ACK/NACK. In other words, the 2 bits in the 2 bit ACK/NACK are ANDED to produce the 1 bit bundled ACK/NACK. The UE 402 provides the combined SR and 1 bit bundled ACK/NACK with the 4 sequence as described above with respect to FIG. 7C.

With regards to FIG. 7D, FIG. 7D illustrates an example of section 506 where SR and a 2 bit ACK/NACK are transmitted by the UE 402 as a joint payload (assuming the UE 402 received the DCI within the PDCCH). As such, the UE 402 uses 8 sequences to represent the different values of the combined 3 bit payload for the combination of SR and ACK/NACK. As shown in FIG. 7C, each of the 8 sequences has a different cyclic shift. The UE 402 uses a first 4 of the 8 sequences to indicate that SR is 1. Thus, when either of the first 4 sequences are used by the UE 402, the base station 404 is configured to determine that SR is 1. Each of the first 4 sequences indicates different values of the 2 bit ACK/NACK (e.g., '00', '01', '10', '11'). On the other hand, the UE 402 uses a second 4 of the 8 sequences to indicate that SR is 0. Thus, when either of the second 4 sequences are used by the UE 402, the base station 404 is configured to determine that SR is 0. Each of the second 4 sequences indicate different values of the 2 bit ACK/NACK (e.g., '00', '01', '10', '11'), just like the first 4 sequences. The 8 sequences are interlaced to maximize the cyclic shift distance between the different values of the joint payload.

With regards to FIG. 7E, FIG. 7E illustrates an example of section 506 where SR and an ACK/NACK are transmitted by the UE 402 as a joint payload (assuming the UE 402 received the DCI within the PDCCH). In this example, the UE 402 selects a plurality of sequences (e.g., 2 for 1 bit ACK/NACK or 4 for a 2 bit ACK/NACK) to within an RB that contains the one symbol in section 506. Each of the plurality of sequences corresponds to a different value of the ACK/NACK. Furthermore, each of the plurality of sequences within the RB indicates that the SR has a value of 0. Additionally, the UE 402 selects a plurality of sequences (e.g., 2 for 1 bit ACK/NACK or 4 for a 2 bit ACK/NACK) to within another RB that contains the one symbol in section 506. Each of the plurality of sequences within the other corresponds to a different value of the ACK/NACK. Furthermore, each of the plurality of sequences indicates that the SR has a value of 1. Accordingly, the UE 402 transmits the joint payload as one of the plurality of sequences in the RB that corresponds to SR having a value of 0 if SR has a value of 0. The one sequence selected also corresponds to the value of the ACK/NACK. However, the UE 402 transmits the joint payload as one of the plurality of sequences in the other RB that corresponds to SR having a value of 1 if SR has a value of 1. The one sequence selected also corresponds to the value of the ACK/NACK. Thus, when the base station 404 receives the UCI from the UE 402, the base station 404 is configured to determine that SR is 0 if the received sequence is in the RB that indicates that the SR is 0 and determine that SR is 1 if the received sequence is in the other RB that indicates that the SR is 1. Additionally, the base station 404 is configured to determine the value of the ACK/NACK depending on which value for ACK/NACK the received sequence corresponds to.

In the example shown in FIGS. 7C-7E, the joint payload are provided within a single RB and thus there are 12 possible cyclic shifts within the RB. For example shown in FIG. 7D, the base station 404 may use integer shift to determine 8 out of the 12 cyclic shifts and assign the 8 sequences to the UE 402. The base station 404 may assign the other 4 to a different UE (not shown) for ACK/NACK only transmission. Alternatively, the base station 404 may use fractional shifts to determine the 8 sequences (e.g., 12/8*(0,1,2,3,4,5,6,7) and assign the 8 sequences to the UE 402. In this case, the base station can't multiplex other users in the RB. Alternatively, the UE 402 may be configured to provide the joint payload using two RBs with 24 possible cyclic shifts. Thus, for example, the base station 404 may use integer shifts to determine 8 of the 24 sequences and assign the 8 sequences to the UE 402. The base station 404 may be configured to multiplex other UEs. For example the base station 404 may be configured to multiplex 2 other UEs (not shown) with the other 16 of the 24 sequences all with 2 bits ACK and SR.

As mentioned above, for the examples provided in both FIGS. 7C-7E, it has been assumed that the UE 402 decoded the DCI within the PDCCH. However, if the UE 402 did not decode the DCI within the PDCCH, the UE 402 does not send an ACK/NACK. This was not a problem with the sequence schemes described with respect to FIG. 6 and FIGS. 7A-7B. For the sequence schemes in FIG. 6 and FIGS. 7A-7B, the UE 402 simply does not send the sequences for ACK/NACK but still sends the SR sequence as discussed with respect to FIG. 6 and FIGS. 7A-7B if an ACK/NACK is not be transmitted by the UE 402. Accordingly, the base station 404 still receives the SR despite there being no ACK/NACK.

However, this is not the case with respect to the sequence schemes described with respect to FIGS. 7C-7E. In the sequence schemes described in FIGS. 7C-7E, the SR and ACK/NACK cannot be separated. As such, the UE 402 is configured to transmit the SR in the semi-statically configured SR RB in accordance with the current agreement (i.e., SR only) for 5G NR when the UE 402 does not decode the DCI within the PDCCH rather than providing the joint payload in accordance with the sequence schemes described with respect to FIGS. 7C-7E. As explained above, SR is provided in accordance with the current agreement for 5G NR with OOK to distinguish between the different values of SR.

Thus, assuming that the UE 402 did not decode the DCI within the PDCCH, the base station 404 does not detect any of the sequences described with respect to FIGS. 7C-7E. Accordingly, the base station 404 receives the SR in the semi-statically configured in accordance with the current agreement for 5G NR. Since OOK is used to transmit the SR in accordance with the current agreement for 5G NR, the base station 404 is configured to detect that SR is positive if the base station 404 detects the sequence for SR in accordance with the current agreement for 5G NR in the semi-statically configured SR resource. The base station will also detect DTX for the ACK/NACK transmission. Otherwise, if the base station 404 does not detect the SR sequence in accordance with the current agreement for 5G NR and does not detect any of the sequences described with respect to FIGS. 7C-7E, then the base station 404 determines that SR is negative. The base station also determines DTX for the ACK/NACK transmission.

It should be noted that the UE 402 may also be configured to transmit SR and ACK/NACK as a joint payload using FDM based design with CP-OFDM waveform for 3 or more UCI payload. More specifically, as described above, when the UCI is three or more bits, the FDM based design with CP-OFDM waveform is used to transmit the UCI in accordance with the current agreement for 5G NR. Thus, instead of providing the UCI information with only one type of UCI information, the SR and ACK/NACK may be combined in a joint payload and transmitted by the UE 402 in accordance with the FDM design scheme of the current agreement for 5G NR.

Figure 8:
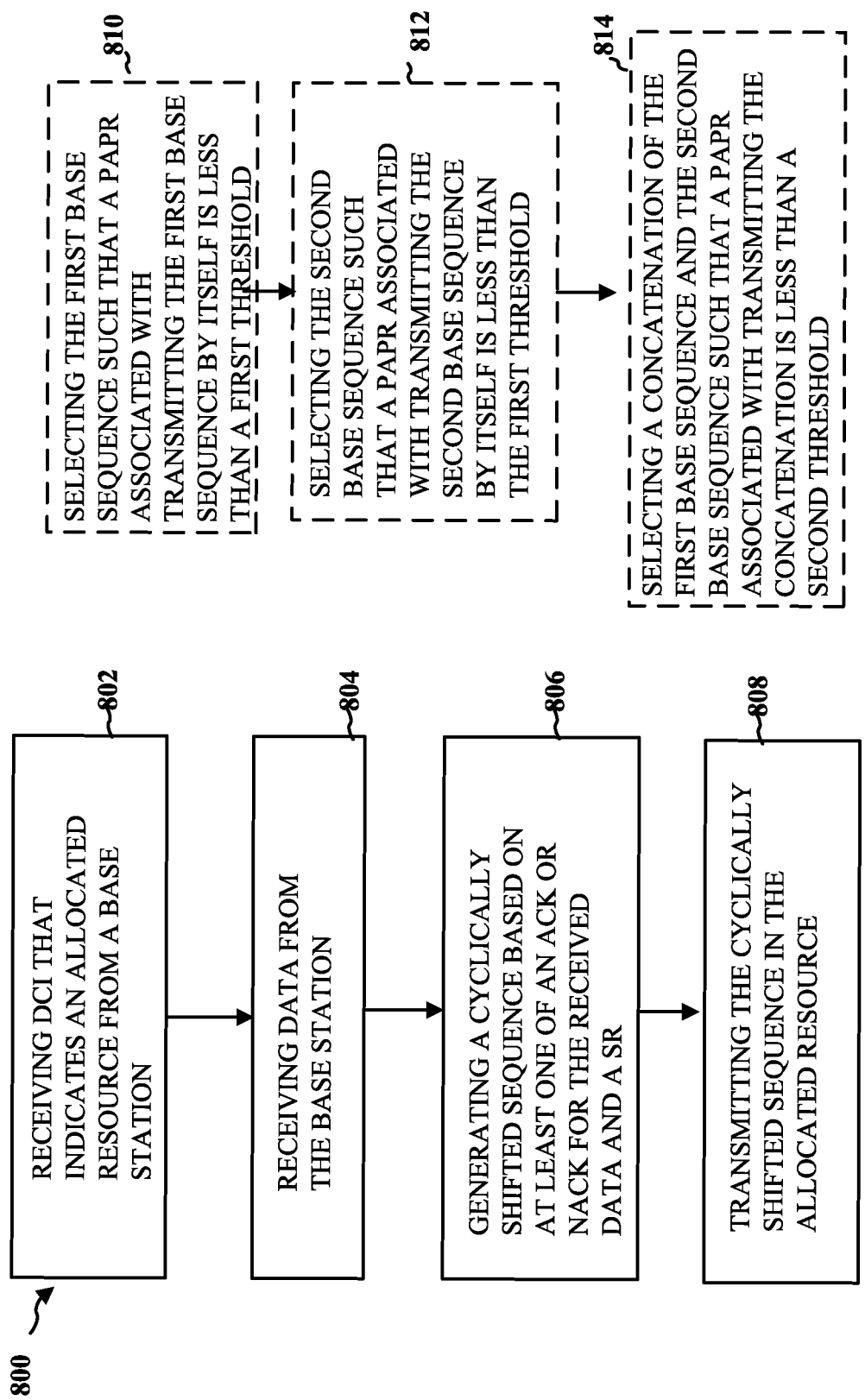
FIG. 8 is a flowchart of a method of wireless communication that may be implemented by a user equipment.

FIG. 8 illustrates a flowchart 800 illustrating a method of wireless communication. The method may be performed by a UE (e.g., the UE 104 and/or the UE 402 described above). At 802, the UE may receive DCI that indicates an allocated resource from a base station. The DCI may be received in a PDCCH from the base station. The DCI may indicate an allocated resource within one symbol of a slot of a subframe. The DCI may also further indicate a second allocated resource of a PDSCH so that the UE may receive data on the second allocated resource from the base station.

At 804, the UE may receive data from the base station. In one aspect, the data is received from the base station in the second allocated resource of the PDSCH.

At 806, the UE may then generate at least one of an ACK or NACK based on the received data. The UE may not generate at least one of an ACK or NACK if UE does not receive DCI at procedure 802. The UE may generate a plurality of cyclically shifted sequences and may map a SR and the at least one of the ACK or NACK to one sequence of the plurality of cyclically shifted sequences. For example, the UE may determine the cyclic shifts of a base sequence assigned to the different values of the ACK/NACK when the SR is positive based on a mapping of the values of the ACK/NACK to the cyclic shift values. For example, when SR is positive and the ACK is one bit (i.e., n=1), the UE may determine the cyclic shift of the base sequence representing the one-bit ACK by mapping the one-bit ACK value to one of two cyclic shifts selected from the second set of $2^n$ sequences. Alternatively, when SR is positive and the ACK is two bits (i.e., n=2), the UE may determine the cyclic shift of the base sequence representing the two-bit ACK by mapping the two-bit ACK value to one of four cyclic shifts selected from the second set of $2^n$ sequences.

At 808, the UE may transmit the cyclically shifted sequence of the SR and the at least one of the ACK or the NACK generated in the allocated resource within one symbol period of a slot of a subframe to the base station. The UE may transmit a SR only in the semi-statically configured SR RB if UE does not receive DCI at procedure 802.

In one aspect, the SR is transmitted in the one symbol of a first RB and the generated at least one of the ACK or the NACK is transmitted in the one symbol of a second RB. For example, the first RB and the second RB may be non-adjacent with respect to a frequency domain. The SR is transmitted using OOK with a first sequence in the one symbol of the first RB and the generated at least one of the ACK or the NACK is transmitted in a second sequence of $2^n$ sequences in the one symbol of the second RB (where n is a number of bits of the generated at least one of the ACK or the NACK).

In another example, the first RB and the second RB are adjacent with respect to a frequency domain. Again, the SR is transmitted using OOK with a first sequence in the one symbol of the first RB and the at least one of the ACK or the NACK generated is transmitted in a second sequence of $2^n$ sequences in the one symbol of the second RB (where n is a number of bits of the generated at least one of the ACK or the NACK).

In this example, the first sequence is a first base sequence with a first cyclic shift in a time domain and the second sequence is a second base sequence with a second cyclic shift in the time domain. The second cyclic shift is one of $2^n$ cyclic shifts. Accordingly, with respect to this example, the method may further include the UE selecting the first base sequence such that a PAPR associated with transmitting the first base sequence by itself is less than a first threshold at 810. Furthermore, the UE may select the second base sequence such that a PAPR associated with transmitting the second base sequence by itself is less than the first threshold at 812. Finally, the UE may select a concatenation of the first base sequence and the second base sequence such that a PAPR associated with transmitting the concatenation is less than a second threshold at 814.

In another aspect, the SR and the at least one of the ACK or the NACK generated are transmitted jointly in the one symbol of a same set of RBs. For example, the SR and the at least one of the ACK or the NACK generated are transmitted in one sequence of $2^{n+1}$ sequences in the one symbol of the set of RBs (where n is a number of bits of the at least one of the ACK or the NACK generated). The one sequence is a base sequence with one of $2^{n+1}$ cyclic shifts of the base sequence. In one aspect of this example, the $2^{n+1}$ sequences comprise a first set of $2^n$ sequences for SR equal to 0 and a second set of $2^n$ sequences for SR equal to 1. The first set of $2^n$ sequences and the second set of $2^n$ sequences are interlaced with respect to the cyclic shifts of the base sequence to maximize a mutual distance between each sequence in the first set of $2^n$ sequences and each sequence in the second set of $2^n$ sequences. In another aspect of this example, the at least one of the ACK or the NACK generated comprises a bundled ACK or NACK, wherein the bundled ACK or NACK is produced by AND'ing a first ACK or NACK with a second ACK or NACK. When a sequence length (L) is an integer multiple of the number of cyclic shifts, the $2^{n+1}$ cyclic shifts may be $2^{n+1}$ integer cyclic shifts.

However, when a sequence length is not an integer multiple of the number of cyclic shifts, the $2^{n+1}$ cyclic shifts comprise $2^{n+1}$ fractional cyclic shifts such that a cyclic shift distance between each of the $2^{n+1}$ fractional cyclic shifts is equal to L divided by $2^{n+1}$ where L is a sequence length of each of the $2^{n+1}$ fractional cyclic shifts.

The minimum shift distance among the set of the $2^{n+1}$ cyclic shifts may be $L/2^{n+1}$. However, when a sequence length is not an integer multiple of the number of cyclic shifts, the $2^{n+1}$ cyclic shifts comprise $2^{n+1}$ fractional cyclic shifts such that a minimum cyclic shift distance between each of the $2^{n+1}$ fractional cyclic shifts is equal to L divided by $2^{n+1}$ where L is a sequence length of each of the $2^{n+1}$ fractional cyclic shifts. Alternatively, when a sequence length is not an integer multiple of the number of cyclic shifts, the $2^{n+1}$ cyclic shifts comprise $2^{n+1}$ integer cyclic shifts such that a minimum cyclic shift distance between each of the $2^{n+1}$ cyclic shifts is equal to a floor operation of $L/2^{n+1}$.

In still yet another aspect, the at least one of the ACK or the NACK generated is transmitted in one sequence of $2^n$ sequences in the one symbol of the set of RBs (where n is a number of bits of the at least one of the ACK or the NACK generated). To indicate the ACK/NACK value, the one sequence is a base sequence with one of $2^n$ cyclic shifts of the base sequence. For the value of SR, the one sequence is transmitted in a first RB of the set of RBs when SR equal to 0 and the one sequence is transmitted in a second RB of the set of RBs when SR equal to 1.

In some implementations, the at least one of the ACK or the NACK is a bundled ACK or NACK. The bundled ACK or NACK is produced by AND'ing a first ACK or NACK with a second ACK or NACK.

Finally, in still another aspect, the SR and the at least one of the ACK or the NACK generated are transmitted jointly in the one symbol within three bits of UCI.

Figure 9:
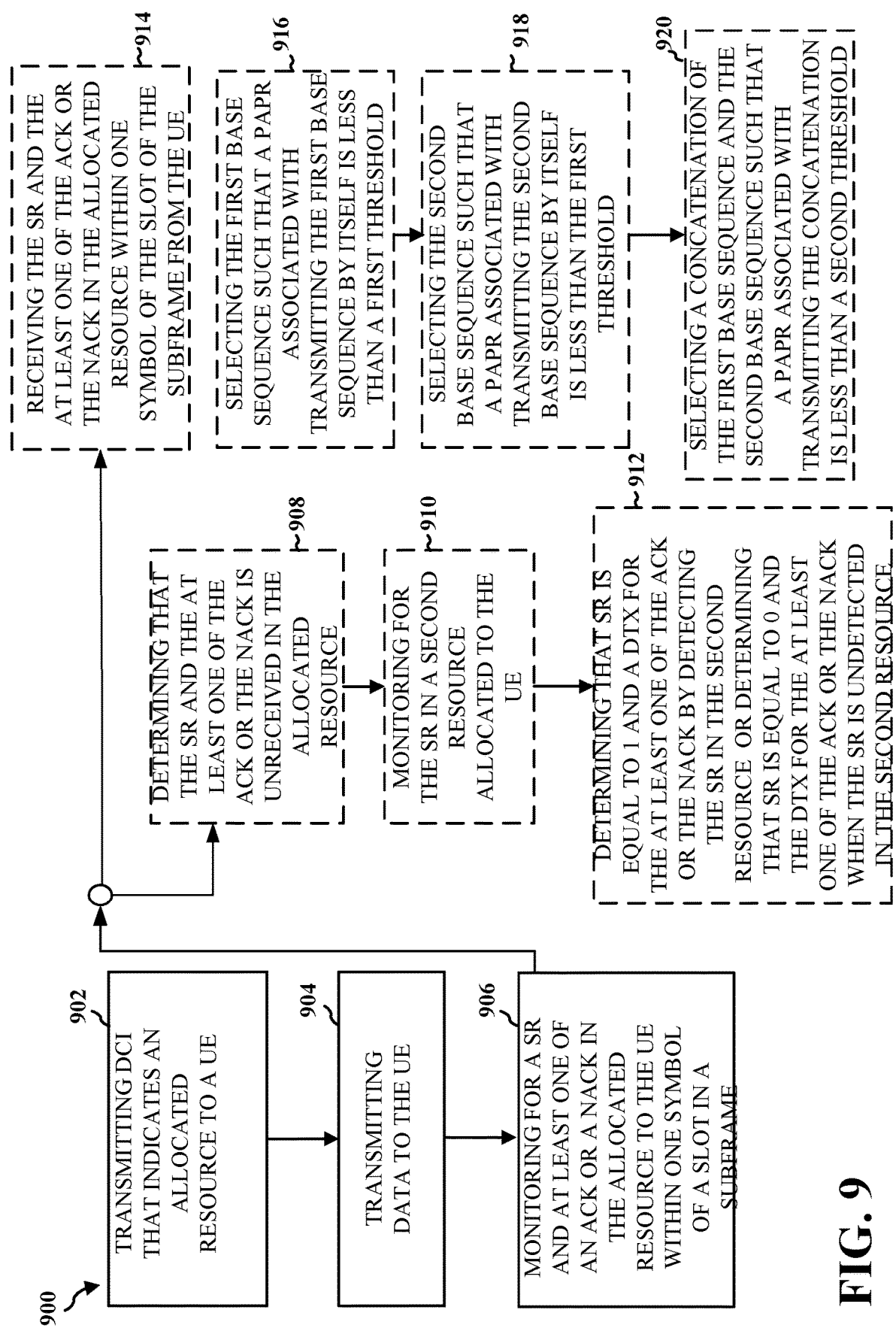
FIG. 9 is a flowchart of a method of wireless communication that may be implemented by a base station.

FIG. 9 is a flowchart 900 of a method of wireless communication. The method may be performed by a base station (e.g., the base station 180 and/or 404). At 902, the base station may transmit DCI that indicates an allocated resource to a UE. The DCI may be transmitted to the UE in a PDCCH. The DCI may indicate an allocated resource within one symbol of a slot of a subframe. The DCI may also further indicate a second allocated resource of a PDSCH so that the UE may receive data on the second allocated resource from the base station.

At 904, the base station transmits data to the UE. In one aspect, the base station may transmit the data to the UE in the second allocated resource of the PDSCH.

At 906, the base station monitors for a SR and at least one of an ACK or a NACK in the allocated resource to the UE within one symbol period of a slot in a subframe. The at least one of the ACK or the NACK is provided by the UE in response to the transmitted data. The SR and the at least one of the ACK or the NACK are indicated by a cyclically shifted sequence. The cyclically shifted sequence corresponds to a sequence that is cyclically shifted to indicate the SR and the at least one of the ACK or the NACK.

At 908, the monitoring at 906 by the base station determines that the SR and the at least one of the ACK or the NACK are not received in the allocated resource. For example, this may be the case when the ACK/NACK and SR design is inseparable (i.e., transmitted as a joint payload). As such, the UE may not have received the DCI transmitted by the base station.

At 910, the base station may monitor for the SR in a second resource allocated to the UE. The second resource may be the semi-statically configured SR resource.

At 912, since the SR and the at least one of the ACK or the NACK are not received in the allocated resource, the base station may determine that SR is equal to 1 and a DTX for the at least one of the ACK or the NACK by detecting the SR in the second resource. On the other hand, the base station may determine that SR is equal to 0 and the DTX for the at least one of the ACK or the NACK when the SR is undetected in the second resource (since the SR and the at least one of the ACK or the NACK is not received in the allocated resource).

At 914, in another aspect of 906, the base station may receive the SR and the at least one of the ACK or the NACK in the allocated resource within one symbol of a slot of a subframe from the UE. In one aspect, the SR is received in the one symbol of a first RB and the at least one of the ACK or the NACK generated is received in the one symbol of a second RB. For example, the first RB and the second RB may be non-adjacent with respect to a frequency domain. The SR is received using OOK with a first sequence in the one symbol of the first RB and the at least one of the ACK or the NACK generated is received in a second sequence of $2^n$ sequences in the one symbol of the second RB (where n is a number of bits of the generated at least one of the ACK or the NACK).

In another example, the first RB and the second RB are adjacent with respect to a frequency domain. Again, the SR is received using OOK with a first sequence in the one symbol of the first RB and the at least one of the ACK or the NACK is received in a second sequence of $2^n$ sequences in the one symbol of the second RB (where n is a number of bits of the at least one of the ACK or the NACK).

In this example, the first sequence is a first base sequence with a first cyclic shift in a time domain and the second sequence is a second base sequence with a second cyclic shift in the time domain. The second cyclic shift is one of $2^n$ cyclic shifts. Accordingly, with respect to this example, the method may further include the UE selecting the first base sequence such that a PAPR associated with transmitting the first base sequence by itself is less than a first threshold at 916. Furthermore, the UE may select the second base sequence such that a PAPR associated with transmitting the second base sequence by itself is less than the first threshold at 918. Finally, the UE may select a concatenation of the first base sequence and the second base sequence such that a PAPR associated with transmitting the concatenation is less than a second threshold at 920.

In another aspect, the SR and the at least one of the ACK or the NACK are received jointly in the one symbol of a same set of RBs. For example, the SR and the at least one of the ACK or the NACK are received in one sequence of $2n+1$ sequences in the one symbol of the set of RBs (where n is a number of bits of the at least one of the ACK or the NACK). The one sequence is a base sequence with one of $2^{n+1}$ cyclic shifts of the base sequence. In one aspect of this example, the $2^{n+1}$ sequences comprise a first set of $2^n$ sequences for SR equal to 0 and a second set of $2^n$ sequences for SR equal to 1. The first set of $2^n$ sequences and the second set of $2^n$ sequences are interlaced with respect to the cyclic shifts of the base sequence to maximize a mutual distance between each sequence in the first set of $2^n$ sequences and each sequence in the second set of $2^n$ sequences. In another aspect of this example, the at least one of the ACK or the NACK comprises a bundled ACK or NACK, wherein the bundled ACK or NACK is produced by AND'ing a first ACK or NACK with a second ACK or NACK. In still yet another aspect of this example, the $2^{n+1}$ sequences comprise a first set of $2^n$ sequences for SR equal to 0 and a second set of $2^n$ sequences for SR equal to 1, wherein the first set of $2^n$ sequences are in a first RB of the set of RBs and the second set of $2^n$ sequences are in a second RB of the set of RBs. When a sequence length (L) is an integer multiple of the number of cyclic shifts, the $2^{n+1}$ cyclic shifts may be $2^{n+1}$ integer cyclic shifts. However, when a sequence length is not an integer multiple of the number of cyclic shifts, the $2^{n+1}$ cyclic shifts comprise $2^{n+1}$ fractional cyclic shifts such that a cyclic shift distance between each of the $2^{n+1}$ fractional cyclic shifts is equal to L divided by $2^{n+1}$ where L is a sequence length of each of the $2^{n+1}$ fractional cyclic shifts. Alternatively, when a sequence length is not an integer multiple of the number of cyclic shifts, the $2^{n+1}$ cyclic shifts comprise $2^{n+1}$ integer cyclic shifts such that a minimum cyclic shift distance between each of the $2^{n+1}$ cyclic shifts is equal to a floor operation of $L/2^{n+1}$.

In some implementations, the at least one of the ACK or the NACK is a bundled ACK or NACK. The bundled ACK or NACK is produced by AND'ing a first ACK or NACK with a second ACK or NACK.

In still yet another aspect, the at least one of the ACK or the NACK are received in one sequence of $2^n$ sequences in the one symbol of the set of RBs (where n is a number of bits of the at least one of the ACK or the NACK). To indicate the ACK/NACK value, the one sequence is a base sequence with one of $2^n$ cyclic shifts of the base sequence. For the value of SR, the one sequence is received in a first RB of the set of RBs when SR equal to 0 and the one sequence is received in a second RB of the set of RBs when SR equal to 1.

Finally, in still another aspect, the SR and the at least one of the ACK or the NACK are received jointly in the one symbol within three bits of UCI.

An apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components.

Figure 10:
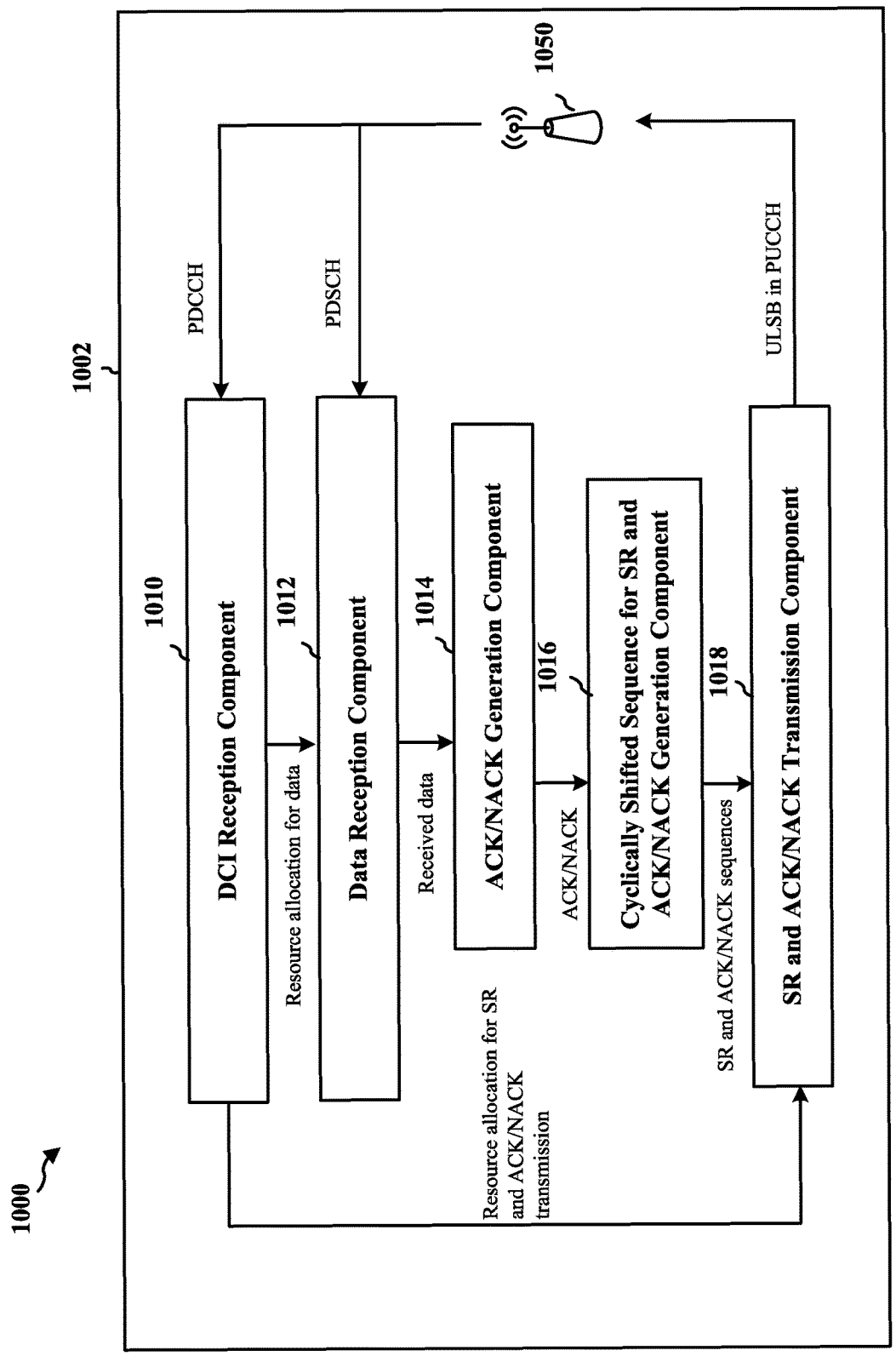
FIG. 10 is a conceptual data flow diagram illustrating the data flow between different modules/means/components in an exemplary apparatus of a user equipment.

FIG. 10 is a conceptual data flow diagram 1000 illustrating the data flow between different modules/means/components in an exemplary apparatus 1002. The apparatus 1002 may be a user equipment. The apparatus 1002 may include a DCI reception component 1010, a data reception component 1012, an ACK/NACK generation component 1014, a cyclically shifted sequence for SR and ACK/NACK generation component 1016, and a SR and ACK/NACK transmission component 1018.

The DCI reception component 1010 may be configured to receive DCI that indicates an allocated resource from a base station. The DCI may be received in a PDCCH from the base station. The DCI may indicate an allocated resource within one symbol of a slot of a subframe to transmit the SR and the ACK/NACK. The DCI may also further indicate a second allocated resource of a PDSCH so that the UE may receive data on the second allocated resource from the base station.

The data reception component 1012 may be configured to receive data from the base station. In one aspect, the data is received from the base station in the second allocated resource of the PDSCH as indicated by the DCI that is received by the reception component 1010.

The ACK/NACK generation component 1014 is configured to generate at least one of an ACK or NACK based on the received data from the data reception component 1012. The UE may not generate at least one of an ACK or NACK if UE does not receive the DCI.

The cyclically shifted sequence for SR and ACK/NACK generation component 1016 is configured to generate the cyclically shifted sequence used to transmit the SR and the ACK/NACK. In one aspect, the SR and the at least one of the ACK or the NACK generated are transmitted in one sequence of $2^{n+1}$ sequences in the one symbol of a set of RBs in a slot of a subframe as indicated by the allocated resource from the DCI (where n is a number of bits of the at least one of the ACK or the NACK generated). The one sequence is a base sequence with one of $2^{n+1}$ cyclic shifts of the base sequence. In one aspect of this example, the $2^{n+1}$ sequences comprise a first set of $2^n$ sequences for SR equal to 0 and a second set of $2^n$ sequences for SR equal to 1. The first set of $2^n$ sequences and the second set of $2^n$ sequences are interlaced with respect to the cyclic shifts of the base sequence to maximize a mutual distance between each sequence in the first set of $2^n$ sequences and each sequence in the second set of $2^n$ sequences. When a sequence length (L) is an integer multiple of the number of cyclic shifts, the $2^{n+1}$ cyclic shifts may be $2^{n+1}$ integer cyclic shifts.

In another aspect, the at least one of the ACK or the NACK generated is transmitted in one sequence of $2^n$ sequences in the one symbol of the set of RBs (where n is a number of bits of the at least one of the ACK or the NACK generated). To indicate the ACK/NACK value, the one sequence is a base sequence with one of $2^n$ cyclic shifts of the base sequence. For the value of SR, the one sequence is transmitted in a first RB of the set of RBs when SR equal to 0 and the one sequence is transmitted in a second RB of the set of RBs when SR equal to 1.

The SR and ACK/NACK transmission component 1018 is configured to transmit the cyclically shifted sequence of the SR and the ACK/NACK generated by the cyclically shifted sequence for SR and ACK/NACK generation component 1016. In one aspect, the SR and the at least one of the ACK or the NACK generated are transmitted jointly in the one symbol period of a same set of RBs. For example, the SR and the at least one of the ACK or the NACK generated may be transmitted in one sequence of $2n+^1$ sequences in the one symbol of the set of RBs (where n is a number of bits of the at least one of the ACK or the NACK generated). In another example, the at least one of the ACK or the NACK generated is transmitted in one sequence of $2^n$ sequences in a first RB of the set of RBs when SR equal to 0 and the one sequence is transmitted in a second RB of the set of RBs when SR equal to 1. In one aspect, the SR and ACK/NACK transmission component 1018 may transmit the SR and the ACK/NACK jointly in the one symbol period within three bits of UCI. In one aspect, the SR and ACK/NACK transmission component 1018 may transmit the SR and the ACK/NACK in a ULSB as part of the PUCCH. In one aspect, the SR and ACK/NACK transmission component 1018 may transmit the SR in a second resource allocated to the apparatus 1002 if a DTX occurred with respect to the ACK/NACK. The second resource may be a semi-statically configured SR resource.

Figure 11:
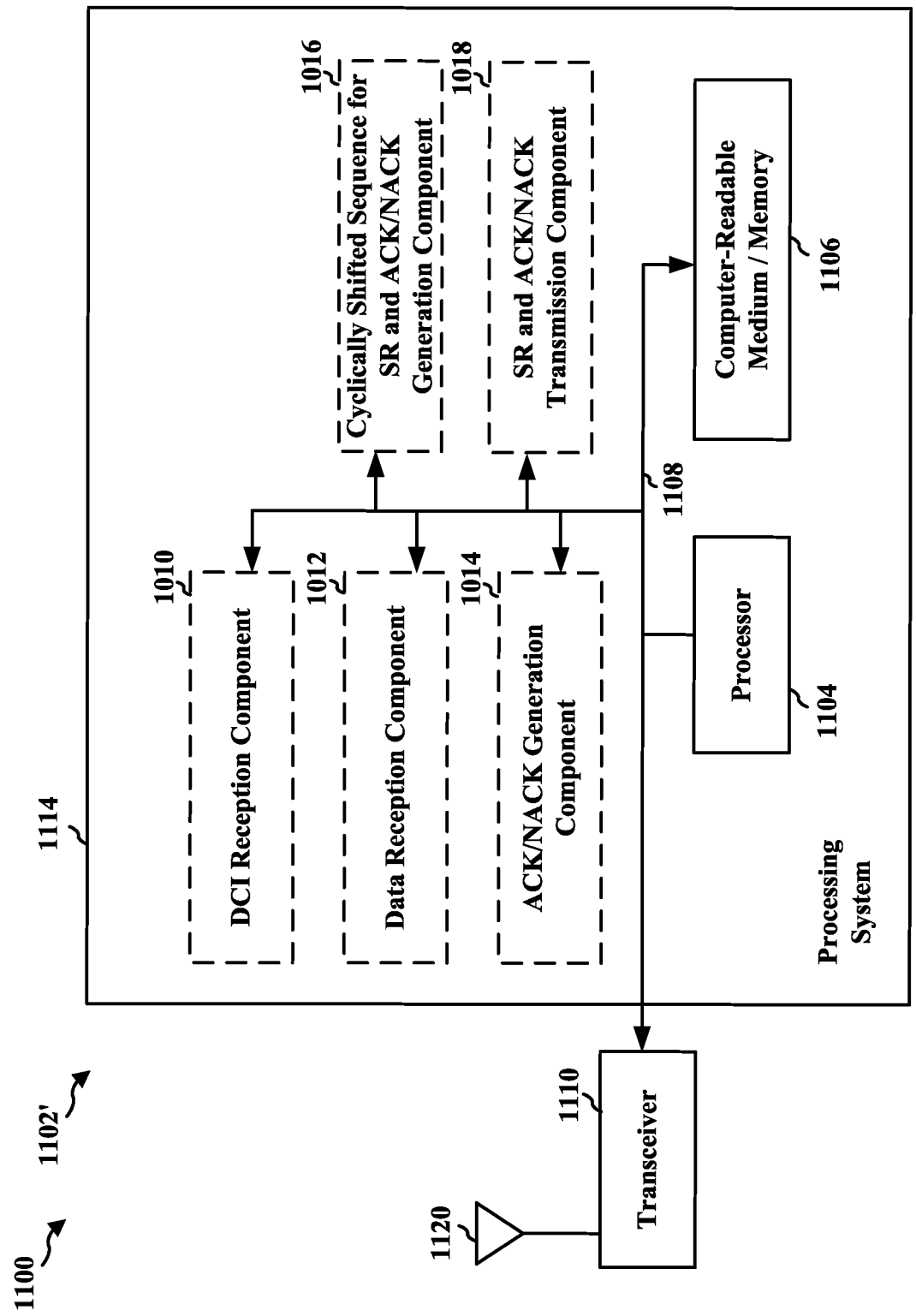
FIG. 11 is a diagram illustrating an example of a hardware implementation for an apparatus of a user equipment employing a processing system.

FIG. 11 is a diagram 1100 illustrating an example of a hardware implementation for an apparatus 1102' of a user equipment employing a processing system 1114. The processing system 1114 may be implemented with a bus architecture, represented generally by the bus 1108. The bus 1108 may include any number of interconnecting buses and bridges depending on the specific application of the processing system 1114 and the overall design constraints. The bus 1108 links together various circuits including one or more processors and/or hardware components, represented by the processor 1104, the components 1010, 1012, 1014, 1016, 1018, and the computer-readable medium/memory 1106. The bus 1108 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information such as the PDCCH and PDSCH from the received signal transmitted by the base station, and provides the extracted information to the processing system 1114, specifically the DCI reception component 1010 and the data reception component 1012. In addition, the transceiver 1110 receives information from the processing system 1114, specifically the SR and the ACK/NACK in the ULSB of PUCCH from the SR and ACK/NACK transmission component 1018, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the components 1010, 1012, 1014, 1016, and 1018. The components may be software components running in the processor 1104 configured to perform the stated processes/algorithm, resident/stored in the computer readable medium/memory 1106 for implementation by the processor 1104, one or more hardware components specifically configured to carry out the stated processes/algorithm, one or more hardware components coupled to the processor 1104, or some combination thereof.

In one configuration, the apparatus 1102' may include means for receiving DCI that indicates an allocated resources from a base station. The means for receiving the DCI that indicates the allocated resources may be implemented by the DCI reception component 1010. The DCI may be received in a PDCCH from the base station. The DCI may indicate an allocated resource within one symbol of a slot of a subframe to transmit the SR and the ACK/NACK. The apparatus 1102' may include means for receiving data from the base station. The means for receiving data from the base station may be implemented by the data reception component 1012. The data may be received from the base station in the second allocated resource of the PDSCH as indicated by the DCI. The apparatus 1102' may include means for generating at least one of the ACK/NACK based on the received data. The means for generating at least one of the ACK/NACK based on the received data may be implemented by the ACK/NACK generation component 1014. The ACK/NACK may not be generated if the DCI is not received.

The apparatus 1102' may include means for generating the cyclically shifted sequence used to transmit the SR and the ACK/NACK. The means for generating the sequence used to transmit the SR and the ACK/NACK may be implemented by the cyclically shifted sequence for SR and ACK/NACK generation component 1016. In one aspect, the SR and the at least one of the ACK or the NACK generated are transmitted in one sequence of $2^{n+1}$ sequences in the one symbol of a set of RB s in a slot of a subframe as indicated by the allocated resource from the DCI (where n is a number of bits of the at least one of the ACK or the NACK generated). The one sequence is a base sequence with one of $2^{n+1}$ cyclic shifts of the base sequence. In one aspect of this example, the $2^{n+1}$ sequences comprise a first set of $2^n$ sequences for SR equal to 0 and a second set of $2^n$ sequences for SR equal to 1. The first set of $2^n$ sequences and the second set of $2^n$ sequences are interlaced with respect to the cyclic shifts of the base sequence to maximize a mutual distance between each sequence in the first set of $2^n$ sequences and each sequence in the second set of $2^n$ sequences. When a sequence length (L) is an integer multiple of the number of cyclic shifts, the $2^{n+1}$ cyclic shifts may be $2^{n+1}$ integer cyclic shifts. In another aspect, the at least one of the ACK or the NACK generated is transmitted in one sequence of $2^n$ sequences in the one symbol of the set of RBs (where n is a number of bits of the at least one of the ACK or the NACK generated). To indicate the ACK/NACK value, the one sequence is a base sequence with one of $2^n$ cyclic shifts of the base sequence. For the value of SR, the one sequence is transmitted in a first RB of the set of RBs when SR equal to 0 and the one sequence is transmitted in a second RB of the set of RBs when SR equal to 1.

The apparatus 1102' may include means for transmitting the cyclically shifted sequence of the SR and the at least one of the ACK or the NACK in the allocated resource within a symbol period of a slot of a subframe to the base station. The mean for transmitting the SR and the ACK/NACK may be implemented by the SR and ACK/NACK transmission component 1018. The SR and the ACK/NACK may be transmitted with the cyclically shifted sequence of the SR and ACK/NACK generated by the cyclically shifted sequence for SR and ACK/NACK generation component 1016. In one aspect, the SR and the at least one of the ACK or the NACK are transmitted jointly in the one symbol period of a same set of RBs. In one aspect, the SR and the ACK/NACK may be transmitted in a ULSB as part of the PUCCH. In one aspect, the SR may be transmitted in a second resource allocated to the apparatus 1102' if a DTX occurred with respect to the ACK/NACK. The second resource may be a semi-statically configured SR resource.

Figure 12:
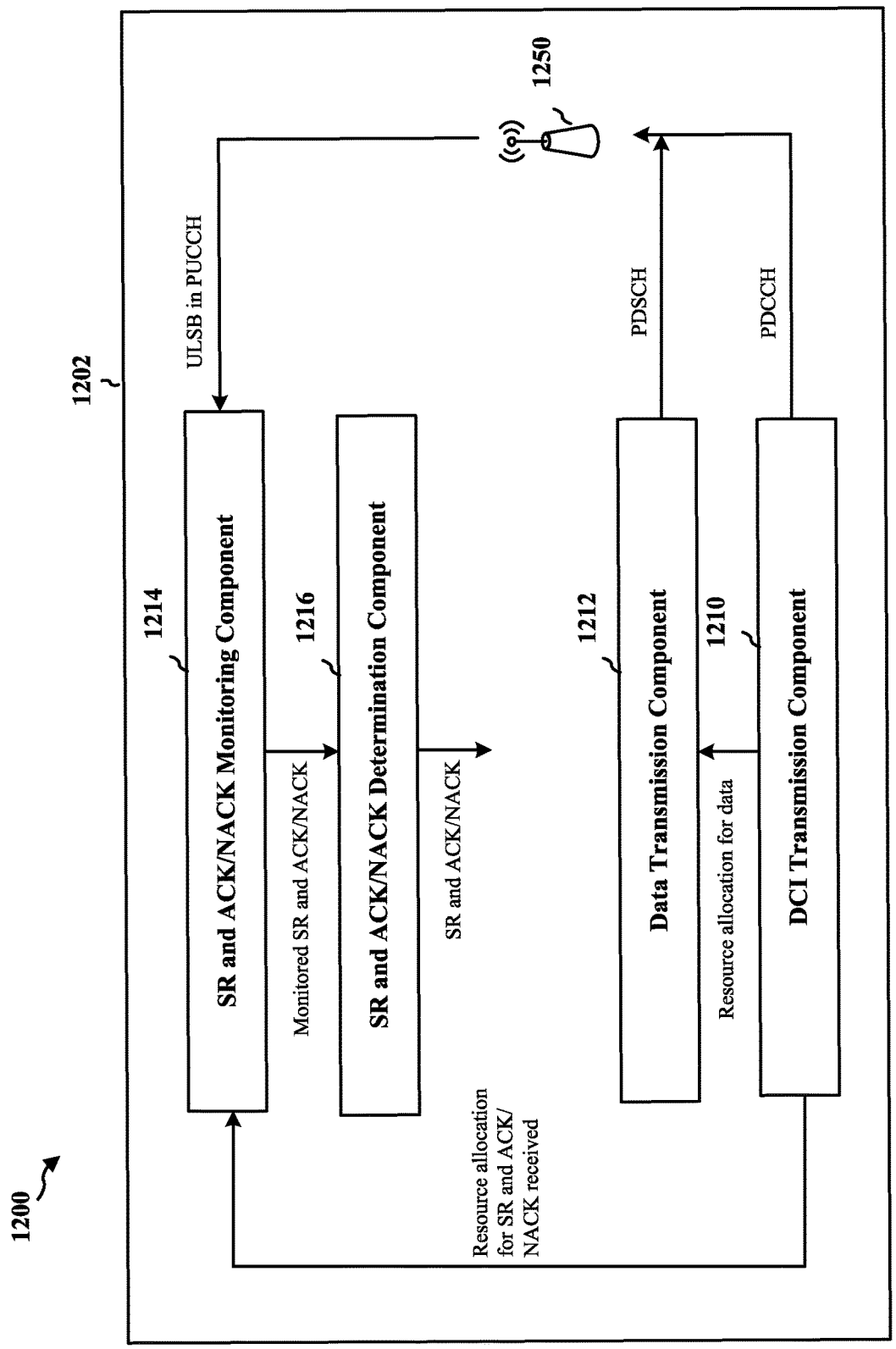
FIG. 12 is conceptual data flow diagram illustrating the data flow between different modules/means/components in an exemplary apparatus of a base station.

FIG. 12 is conceptual data flow diagram 1200 illustrating the data flow between different modules/means/components in an exemplary apparatus 1202. The apparatus 1202 may be a base station. The apparatus 1202 may include a DCI transmission component 1210, a data transmission component 1212, a SR and ACK/NACK monitoring component 1214, and a SR and ACK/NACK determination component 1216.

The DCI transmission component 1210 may be configured to transmit DCI that indicates an allocated resource to a UE. The DCI transmission component 1210 may be configured to transmit DCI to the UE in a PDCCH. The DCI may indicate an allocated resource within one symbol of a slot of a subframe. The DCI may also further indicate a second allocated resource of a PDSCH so that the UE may receive data on the second allocated resource from the base station.

The data transmission component 1212 may be configured to transmit data to the UE. In one aspect, the data transmission component 121 may be configured to transmit the data to the UE in the second allocated resource of the PDSCH as indicated by the DCI.

The SR and ACK/NACK monitoring component 1214 may be configured to monitor for a SR and at least one of an ACK or a NACK received in the resource allocated to the UE for transmitting the SR and the at least one of the ACK or the NACK within one symbol period of a slot in a subframe. The at least one of the ACK or the NACK is provided by the UE in response to the transmitted data. The SR and the at least one of the ACK or the NACK may be indicated by a cyclically shifted sequence.

The SR and ACK/NACK determination component 1216 may be configured to determine if the SR and the at least one of the ACK or the NACK are received in the allocated resource. In one aspect, the SR and the at least one of the ACK or the NACK may not be received in the allocated resource when the ACK/NACK and SR are transmitted as a joint payload and the UE did not receive the DCI transmitted by the base station. In this scenario, the SR and ACK/NACK monitoring component 1214 may be configured to monitor for the SR in a second resource allocated to the UE. The second resource may be a semi-statically configured SR resource. The SR and ACK/NACK determination component 1216 may be configured to determine if the SR is received in the second resource. If the SR is received in the second resource, the SR is equal to 1 and a DTX occurred for the at least one of the ACK or the NACK. If the SR is not received in the second resource, the SR is equal to 0 and a DTX occurred for the at least one of the ACK or the NACK.

In one aspect, the SR and the at least one of the ACK or the NACK are received jointly in the one symbol of a same set of RBs. For example, the SR and the at least one of the ACK or the NACK are received in one sequence of $2^{n+1}$ sequences in the one symbol of the set of RBs (where n is a number of bits of the at least one of the ACK or the NACK). The one sequence is a base sequence with one of $2^{n+1}$ cyclic shifts of the base sequence. In one aspect, the $2^{n+1}$ sequences comprise a first set of $2^n$ sequences for SR equal to 0 and a second set of $2^n$ sequences for SR equal to 1. The first set of $2^n$ sequences and the second set of $2^n$ sequences are interlaced with respect to the cyclic shifts of the base sequence to maximize a mutual distance between each sequence in the first set of $2^n$ sequences and each sequence in the second set of $2^n$ sequences. In still yet another aspect, the $2^{n+1}$ sequences comprise a first set of $2^n$ sequences for SR equal to 0 and a second set of $2^n$ sequences for SR equal to 1, wherein the first set of $2^n$ sequences are in a first RB of the set of RBs and the second set of $2^n$ sequences are in a second RB of the set of RBs. When a sequence length (L) is an integer multiple of the number of cyclic shifts, the $2^{n+1}$ cyclic shifts may be $2^{n+1}$ integer cyclic shifts. In one aspect, the SR and the ACK/NACK may be received jointly in the one symbol within three bits of UCI. In one aspect, the SR and the ACK/NACK may be received in a ULSB as part of the PUCCH.

Figure 13:
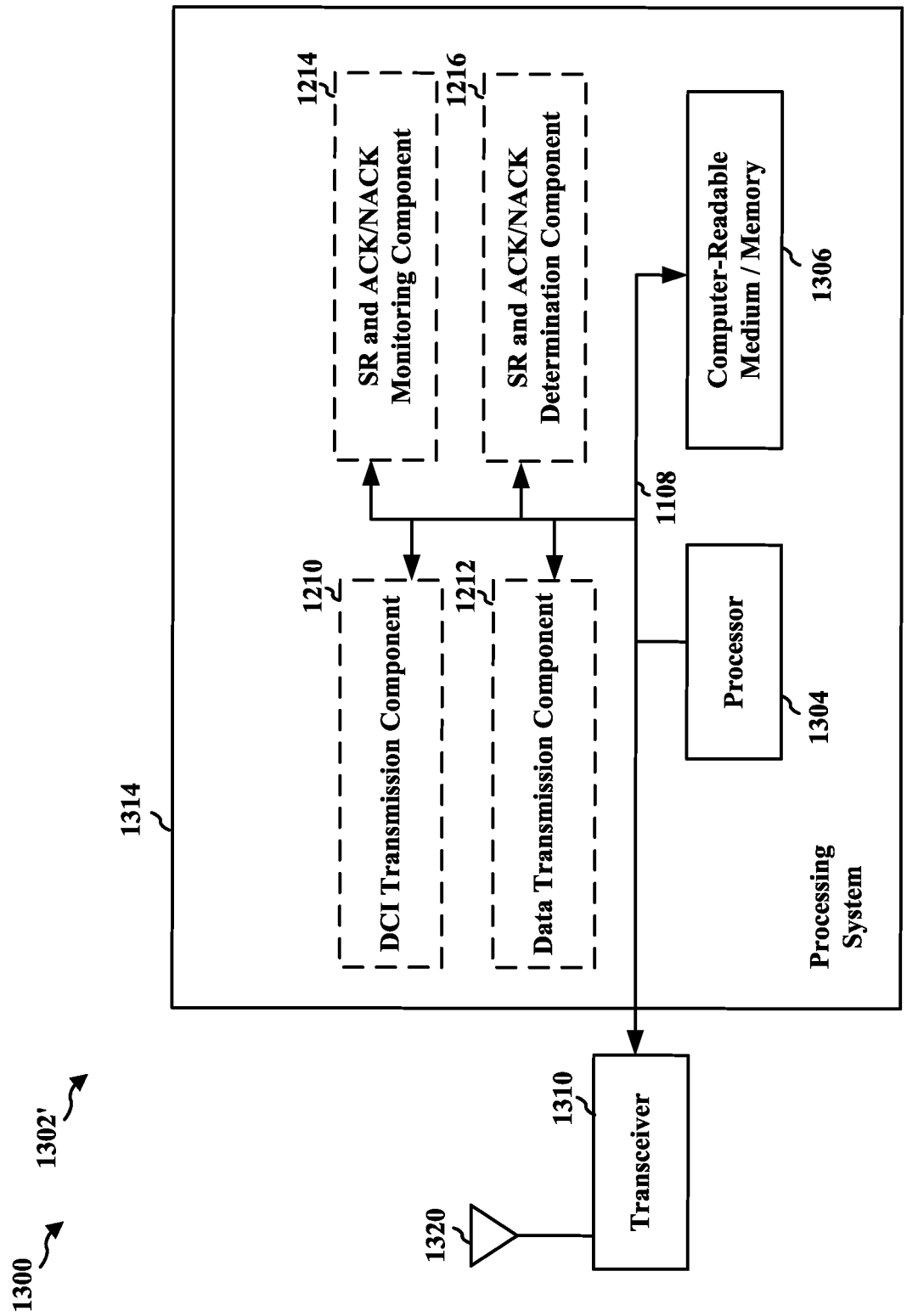
FIG. 13 is a diagram illustrating an example of a hardware implementation for an apparatus of a base station employing a processing system.

FIG. 13 is a diagram 1300 illustrating an example of a hardware implementation for an apparatus 1302' of a base station employing a processing system 1314. The processing system 1314 may be implemented with a bus architecture, represented generally by the bus 1308. The bus 1308 may include any number of interconnecting buses and bridges depending on the specific application of the processing system 1314 and the overall design constraints. The bus 1308 links together various circuits including one or more processors and/or hardware components, represented by the processor 1304, the components 1210, 1212, 1214, 1216, and the computer-readable medium/memory 1306. The bus 1308 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information such as PUCCH or ULSB in the PUCCH from the received signal transmitted by the UE, and provides the extracted information to the processing system 1314, specifically the SR and ACK/NACK monitoring component 1214. In addition, the transceiver 1310 receives information from the processing system 1314, specifically the PDCCH containing the DCI from the DCI transmission component 1210 and the PDSCH from the data transmission component 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1210, 1212, 1214, and 1216. The components may be software components running in the processor 1304 configured to perform the stated processes/algorithm, resident/stored in the computer readable medium/memory 1306 for implementation by the processor 1304, one or more hardware components specifically configured to carry out the stated processes/algorithm, one or more hardware components coupled to the processor 1304, or some combination thereof.

In one configuration, the apparatus 1302' may include means for transmitting DCI that indicates an allocated resource to a UE. The means for transmitting the DCI that indicates an allocated resource to a UE may be implemented by the DCI transmission component 1210. The DCI may be transmitted to the UE in a PDCCH. The DCI may indicate an allocated resource within one symbol of a slot of a subframe for the UE to transmit the SR and the ACK/NACK. The DCI may also further indicate a second allocated resource of a PDSCH so that the UE may receive data on the second allocated resource from the base station.

The apparatus 1302' may include means for transmitting data to the UE. The means for transmitting data to the UE may be implemented by the data transmission component 1212. The data may be transmitted to the UE in the second allocated resource of the PDSCH as indicated by the DCI.

The apparatus 1302' may include means for monitoring for a SR and at least one of an ACK or NACK in the resource allocated to the UE for indicating the SR and the at least one of the ACK or the NACK within a symbol period of a slot in subframe. The at least one of the ACK or the NACK is provided by the UE in response to the transmitted data. The SR and the at least one of the ACK or the NACK may be indicated by a cyclically shifted sequence. The means for monitoring for a SR and at least one of an ACK or NACK in the resource allocated to the UE may be implemented by the SR and ACK/NACK monitoring component 1214.

The apparatus 1302' may include means for determining if the SR and the at least one of the ACK or the NACK are received in the allocated resource. The means for determining if the SR and the at least one of the ACK or the NACK are received in the allocated resource may be implemented by the SR and ACK/NACK determination component 1216. In one aspect, the SR and the at least one of the ACK or the NACK may not be received in the allocated resource when the ACK/NACK and SR are transmitted as a joint payload and the UE did not receive the DCI transmitted by the base station. In this scenario, the means for monitoring for a SR and at least one of an ACK or NACK in the resource allocated to the UE may monitor for the SR in a second resource allocated to the UE. The second resource may be a semi-statically configured SR resource. The means for determining if the SR and the at least one of the ACK or the NACK are received in the allocated resource may determine if the SR is received in the second resource. If the SR is received in the second resource, the SR is equal to 1 and a DTX occurred for the at least one of the ACK or the NACK. If the SR is not received in the second resource, the SR is equal to 0 and a DTX occurred for the at least one of the ACK or the NACK. In one aspect, the SR and the ACK/NACK may be received in a ULSB as part of the PUCCH.

In one aspect, the means for determining if the SR and the at least one of the ACK or the NACK are received in the allocated resource may determine if the SR and the at least one of the ACK or the NACK are received jointly in the one symbol of a same set of RBs. For example, the SR and the at least one of the ACK or the NACK are received in one sequence of $2n+1$ sequences in the one symbol of the set of RBs (where n is a number of bits of the at least one of the ACK or the NACK). The one sequence is a base sequence with one of $2^{n+1}$ cyclic shifts of the base sequence. In one aspect, the $2^{n+1}$ sequences comprise a first set of $2^n$ sequences for SR equal to 0 and a second set of $2^n$ sequences for SR equal to 1. The first set of $2^n$ sequences and the second set of $2^n$ sequences are interlaced with respect to the cyclic shifts of the base sequence to maximize a mutual distance between each sequence in the first set of $2^n$ sequences and each sequence in the second set of $2^n$ sequences. In still yet another aspect, the $2^{n+1}$ sequences comprise a first set of $2^n$ sequences for SR equal to 0 and a second set of $2^n$ sequences for SR equal to 1, wherein the first set of $2^n$ sequences are in a first RB of the set of RB s and the second set of $2^n$ sequences are in a second RB of the set of RBs. When a sequence length (L) is an integer multiple of the number of cyclic shifts, the $2^{n+1}$ cyclic shifts may be $2^{n+1}$ integer cyclic shifts. In one aspect, the SR and the ACK/NACK may be received jointly in the one symbol within three bits of UCI.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   memory; and
   at least one processor coupled to the memory, wherein the at least one processor is configured to:
     receive data;
     generate a single cyclically shifted sequence based on both: feedback information corresponding to the data and a scheduling request (SR), wherein the single cyclically shifted sequence is based on a first cyclic shift when the SR is negative and a second cyclic shift when the SR is positive, wherein the first cyclic shift corresponds to 0 or $\pi$, and wherein the second cyclic shift corresponds to $\pi/2$ or $3\pi/2$; and
     transmit, via the single cyclically shifted sequence, the SR and the feedback information jointly within a symbol of a slot, wherein the single cyclically shifted sequence is one sequence of $2^{n+1}$ sequences, and wherein n is a quantity of bits of the feedback information.

2. The apparatus of claim 1, wherein a subframe includes the slot.

3. The apparatus of claim 1, wherein the single cyclically shifted sequence is a sequence with one of a set of cyclic shifts of a base sequence, and wherein each sequence of the $2^{n+1}$ sequences is associated with one cyclic shift of the set of cyclic shifts.

4. The apparatus of claim 3, wherein, to receive the data, the at least one processor is configured to receive the data in a physical downlink shared channel (PDSCH) resource.

5. The apparatus of claim 3, wherein the set of cyclic shifts comprise a set of integer cyclic shifts, wherein a fifth cyclic shift between each of the set of cyclic shifts corresponds to L divided by $2^{n+1}$, wherein L is a sequence length of each of the $2^{n+1}$ sequences.

6. The apparatus of claim 1, wherein the $2^{n+1}$ sequences comprise a first set of $2^n$ sequences for the SR equal to a first value and a second set of $2^n$ sequences for the SR equal to a second value.

7. The apparatus of claim 6, wherein the feedback information includes acknowledgement (ACK) or negative ACK (NACK) information.

8. The apparatus of claim 7, wherein each sequence of the first set of $2^n$ sequences and each sequence of the second set of $2^n$ sequences indicates respective ACK or NACK information.

9. The apparatus of claim 7, wherein the first set of $2^n$ sequences and the second set of $2^n$ sequences are interlaced with respect to cyclic shifts of a base sequence to maximize a mutual distance between each sequence in the first set of $2^n$ sequences and each sequence in the second set of $2^n$ sequences.

10. The apparatus of claim 7, wherein the ACK or NACK information comprises bundled ACK or NACK information, wherein the bundled ACK or NACK information is based on AND'ing first ACK or NACK information of the ACK or NACK information with second ACK or NACK information of the ACK or NACK information.

11. The apparatus of claim 7, wherein, to transmit the SR and the feedback information jointly via the single cyclically shifted sequence, the at least one processor is configured to transmit the SR and the feedback information via the single cyclically shifted sequence in a first resource block (RB) when the SR equals to 0 and in a second RB when the SR equals to 1.

12. The apparatus of claim 1, wherein, to transmit the SR and the feedback information jointly via the single cyclically shifted sequence, the at least one processor is configured to transmit the SR and the feedback information jointly via the single cyclically shifted sequence within three bits of uplink control information (UCI).

13. The apparatus of claim 1, wherein, to transmit the SR and the feedback information jointly via the single cyclically shifted sequence, the at least one processor is configured to transmit the SR in accordance with on-off keying (OOK).

14. A method of wireless communication performed by an apparatus, comprising:
   receiving data;
   generating a single cyclically shifted sequence based on both: feedback information corresponding to the data and a scheduling request (SR), wherein the single cyclically shifted sequence is based on a first cyclic shift when the SR is negative and a second cyclic shift when the SR is positive, wherein the first cyclic shift corresponds to 0 or $\pi$, and wherein the second cyclic shift corresponds to $\pi/2$ or $3\pi/2$; and transmitting, via the single cyclically shifted sequence, the SR and the feedback information jointly within a symbol of a slot, wherein the single cyclically shifted sequence is one sequence of $2^{n+1}$ sequences, and wherein n is a quantity of bits of the feedback information.

15. The method of claim 14, wherein a subframe includes the slot.

16. The method of claim 14, wherein the single cyclically shifted sequence is a sequence with one of a set of cyclic shifts of a base sequence, and wherein each sequence of the $2^{n+1}$ sequences is associated with one cyclic shift of the set of cyclic shifts.

17. The method of claim 16, wherein receiving the data comprises receiving the data in a physical downlink shared channel (PDSCH) resource.

18. The method of claim 16, wherein the set of cyclic shifts comprise a set of integer cyclic shifts, wherein a fifth cyclic shift between each of the set of cyclic shifts corresponds to L divided by $2^{n+1}$, wherein L is a sequence length of each of the $2^{n+1}$ sequences.

19. The method of claim 14, wherein the $2^{n+1}$ sequences comprise a first set of $2^n$ sequences for the SR equal to a first value and a second set of $2^n$ sequences for the SR equal to a second value.

20. The method of claim 19, wherein the feedback information includes acknowledgement (ACK) or negative ACK (NACK) information.

21. The method of claim 20, wherein each sequence of the first set of $2^n$ sequences and each sequence of the second set of $2^n$ sequences indicates respective ACK or NACK information.

22. The method of claim 20, wherein the first set of $2^n$ sequences and the second set of $2^n$ sequences are interlaced with respect to the cyclic shifts of a base sequence to maximize a mutual distance between each sequence in the first set of $2^n$ sequences and each sequence in the second set of $2^n$ sequences.

23. The method of claim 20, wherein the ACK or NACK information comprises bundled ACK or NACK information, wherein the bundled ACK or NACK information is based on AND'ing first ACK or NACK information of the ACK or NACK information with second ACK or NACK information of the ACK or NACK information.

24. The method of claim 20, wherein transmitting the SR and the feedback information jointly via the single cyclically shifted sequence comprises transmitting the SR and the feedback information via the single cyclically shifted sequence in a first resource block (RB) when the SR equals to 0 and in a second RB when the SR equals to 1.

25. The method of claim 14, wherein transmitting the SR and the feedback information jointly via the single cyclically shifted sequence comprises transmitting the SR and the feedback information jointly via the single cyclically shifted sequence within three bits of uplink control information (UCI).

26. The method of claim 14, wherein transmitting the SR and the feedback information jointly via the single cyclically shifted sequence comprises transmitting the SR in accordance with on-off keying (OOK).

27. An apparatus for wireless communication, comprising:
memory; and
at least one processor coupled to the memory, wherein the at least one processor is configured to:
transmit data; and
monitor for feedback information corresponding to the data and a scheduling request (SR) in a single cyclically shifted sequence within a symbol of a slot, wherein the single cyclically shifted sequence is one sequence of $2^{n+1}$ sequences, wherein n is a quantity of bits of the feedback information, wherein the single cyclically shifted sequence is based on a first cyclic shift when the SR is negative and a second cyclic shift when the SR is positive, wherein the first cyclic shift corresponds to 0 or $\pi$, and wherein the second cyclic shift corresponds to $\pi/2$ or $3\pi/2$.

28. The apparatus of claim 27, wherein a subframe includes the slot.

29. The apparatus of claim 27, wherein the single cyclically shifted sequence is a sequence with one of a set of cyclic shifts of a base sequence, and wherein each sequence of the $2^{n+1}$ sequences is associated with one cyclic shift of the set of cyclic shifts.

30. The apparatus of claim 29, wherein the set of cyclic shifts comprise a set of integer cyclic shifts, wherein a fifth cyclic shift between each of the set of cyclic shifts corresponds to L divided by $2^{n+1}$, wherein L is a sequence length of each of the $2^{n+1}$ sequences.

31. The apparatus of claim 27, wherein the $2^{n+1}$ sequences comprise a first set of $2^n$ sequences for the SR equal to a first value and a second set of $2^n$ sequences for the SR equal to a second value.

32. The apparatus of claim 31, wherein the feedback information includes acknowledgement (ACK) or negative ACK (NACK) information.

33. The apparatus of claim 32, wherein each sequence of the first set of $2^n$ sequences and each sequence of the second set of $2^n$ sequences indicates respective ACK or NACK information.

34. The apparatus of claim 32, wherein the first set of $2^n$ sequences and the second set of $2^n$ sequences are interlaced with respect to cyclic shifts of a base sequence to maximize a mutual distance between each sequence in the first set of $2^n$ sequences and each sequence in the second set of $2^n$ sequences.

35. The apparatus of claim 32, wherein the ACK or NACK information comprises bundled ACK or NACK information, wherein the bundled ACK or NACK information is based on AND'ing first ACK or NACK information of the ACK or NACK information with second ACK or NACK information of the ACK or NACK information.

36. A method for wireless communication performed by a base station, comprising:
transmitting data; and
monitoring for feedback information corresponding to the data and a scheduling request (SR) in a single cyclically shifted sequence within a symbol of a slot, wherein the single cyclically shifted sequence is one sequence of $2^{n+1}$ sequences, wherein n is a quantity of bits of the feedback information, wherein the single cyclically shifted sequence is based on a first cyclic shift when the SR is negative and a second cyclic shift when the SR is positive, wherein the first cyclic shift corresponds to 0 or $\pi$, and wherein the second cyclic shift corresponds to $\pi/2$ or $3\pi/2$.

\* \* \* \* \*